(12) United States Patent
Leem et al.

(10) Patent No.: US 12,346,145 B2
(45) Date of Patent: Jul. 1, 2025

(54) PASSIVE PEDAL FORCE EMULATOR HAVING COIL SPRINGS

(71) Applicant: KSR IP Holdings, LLC, Wilmington, DE (US)

(72) Inventors: Daniel Leem, Chatham (CA); Amir Jaboukji, West Lorne (CA); Matthew Vyskocil, Ridgetown (CA); Benjamin Scott Hill, Dresden (CA); Dan O'Neill, Tilbury (CA)

(73) Assignee: KSR IP HOLDINGS, LLC, Wilmington, DE (US)

( * ) Notice: Subject to any disclaimer, the term of this patent is extended or adjusted under 35 U.S.C. 154(b) by 0 days.

(21) Appl. No.: 18/240,652

(22) Filed: Aug. 31, 2023

(65) Prior Publication Data

US 2024/0069586 A1 Feb. 29, 2024

Related U.S. Application Data

(60) Provisional application No. 63/402,714, filed on Aug. 31, 2022.

(51) Int. Cl.
| | |
|---|---|
| *G05G 5/03* | (2008.04) |
| *G05G 1/44* | (2008.04) |
| *G05G 5/05* | (2006.01) |
| *B60T 7/04* | (2006.01) |
| *G05G 1/38* | (2008.04) |

(52) U.S. Cl.
CPC ............... *G05G 5/03* (2013.01); *G05G 1/44* (2013.01); *G05G 5/05* (2013.01); *B60T 7/042* (2013.01); *G05G 1/38* (2013.01); *G05G 2505/00* (2013.01)

(58) Field of Classification Search
CPC ............ B60K 26/021; F16F 1/046; F16F 3/04
See application file for complete search history.

(56) References Cited

U.S. PATENT DOCUMENTS

| | | | |
|---|---|---|---|
| 3,910,048 A | 10/1975 | Gardner | |
| 4,249,381 A | 2/1981 | Gaiser | |
| 5,224,689 A * | 7/1993 | Georgiev | B60G 11/14 267/225 |

(Continued)

FOREIGN PATENT DOCUMENTS

| | | | |
|---|---|---|---|
| DE | 102007030312 A1 | 1/2009 | |
| DE | 102010027924 A1 * | 10/2011 | ............. B60K 26/02 |

(Continued)

*Primary Examiner* — Daniel D Yabut
(74) *Attorney, Agent, or Firm* — Dinsmore & Shohl LLP

(57) ABSTRACT

The present disclosure is directed to a pedal assembly that includes a pedal arm configured to move based on a load applied thereon and a housing that includes a first housing member having a first cavity and a pushrod operably connected to the pedal arm and to the first housing member. A first cradle positioned within the first cavity. The first cradle includes a second cavity. A first pair of springs positioned to extend within the second cavity. A second housing member having a third cavity. A second pair of springs positioned to extend within the second cavity and the third cavity. When a first predetermined load is applied to the pedal arm, the pushrod moves which drives the first cradle against the first pair of springs such that at least a compression energy by the first pair of springs generates a first force feedback onto the pedal arm.

16 Claims, 15 Drawing Sheets

(56) References Cited

U.S. PATENT DOCUMENTS

| | | |
|---|---|---|
| 5,720,170 A | 2/1998 | Hageman et al. |
| 5,729,979 A | 3/1998 | Shaw et al. |
| 6,014,862 A | 1/2000 | Shaw et al. |
| 6,367,886 B1 | 4/2002 | Shaw |
| 6,464,306 B2 | 10/2002 | Shaw et al. |
| 6,896,337 B1 | 5/2005 | Backhus et al. |
| 10,919,507 B2 | 2/2021 | Anderson et al. |
| 11,292,338 B2 | 4/2022 | Burke et al. |
| 11,560,127 B2 | 1/2023 | Galea et al. |
| 2002/0056337 A1 | 5/2002 | Sundaresan et al. |
| 2002/0117893 A1 | 8/2002 | Shaw et al. |
| 2008/0276750 A1* | 11/2008 | Kim .................. G05G 1/38 74/513 |
| 2014/0360177 A1 | 12/2014 | Ryu et al. |
| 2018/0093648 A1 | 4/2018 | Pennala et al. |
| 2018/0239389 A1* | 8/2018 | Neubauer .............. G05G 5/03 |
| 2018/0257622 A1 | 9/2018 | Saito et al. |
| 2020/0001711 A1 | 1/2020 | Burke et al. |
| 2020/0353908 A1 | 11/2020 | Street et al. |
| 2022/0219659 A1 | 7/2022 | Wagner et al. |
| 2022/0274572 A1 | 9/2022 | Ganzel |
| 2022/0314939 A1 | 10/2022 | Wagner |
| 2022/0332295 A1 | 10/2022 | Hoxie et al. |
| 2022/0379723 A1* | 12/2022 | Vyskocil ............... G05G 5/03 |
| 2022/0379852 A1 | 12/2022 | O'Neill |
| 2023/0114657 A1 | 4/2023 | Wagner et al. |

FOREIGN PATENT DOCUMENTS

| | | | |
|---|---|---|---|
| DE | 102011106396 A1 | 4/2012 | |
| DE | 102017104278 A1 | 9/2018 | |
| DE | 102019219337 A1 | 4/2021 | |
| DE | 102020130412 A1 * | 5/2021 | ........... B60T 13/746 |
| EP | 3589518 B1 | 4/2021 | |
| GB | 1249930 A | 10/1971 | |
| WO | 2001040038 A1 | 6/2001 | |
| WO | 2017202512 A1 | 11/2017 | |

\* cited by examiner

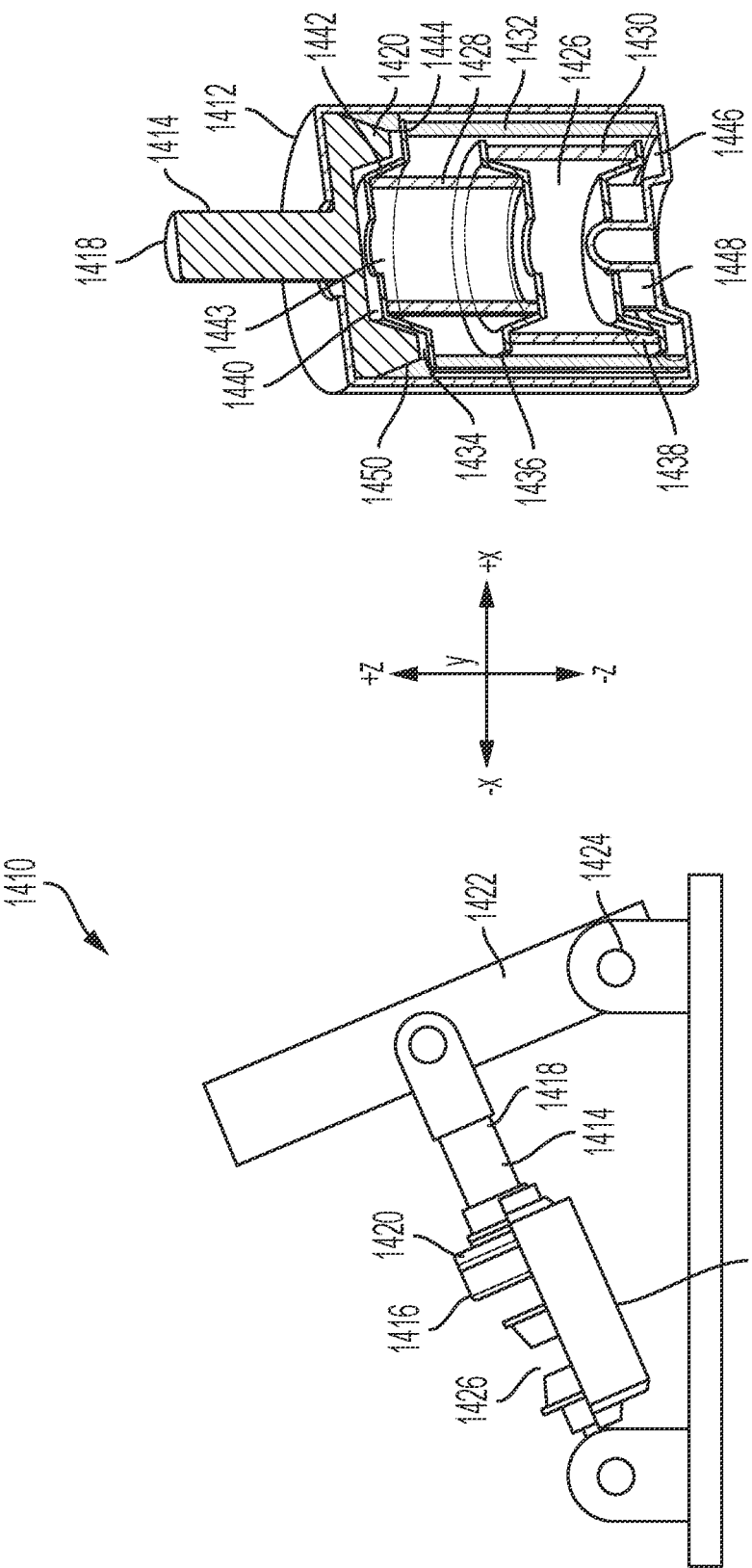

PASSIVE PEDAL FORCE EMULATOR HAVING COIL SPRINGS

CROSS-REFERENCE TO RELATED APPLICATIONS

This utility patent application claims priority benefit from U.S. Provisional Patent Application Ser. No. 63/402,714, filed Aug. 31, 2022, and entitled "Passive Pedal Force Emulator Having Coil Springs", the content of which is hereby incorporated by reference in its entirety.

TECHNICAL FIELD

The present specification generally relates to pedal assemblies for vehicles and, more specifically, to passive force emulator based on a pedal movement.

BACKGROUND

Many braking system are passive driven. However, newer braking system are now utilizing an e-boost braking system where a boost of the braking system is provided by an electric motor to provide an active force to the braking system. As such, the need for mechanical braking by the operator is on the decline, being replace with a need for system components of the braking system to perform the braking on behalf of the operator is increasing. While the mechanism of braking is switching, there remains a need for the operator to receive resistive feedback as the brake pedal is deployed in order to garner a sense to the extent of braking force actually applied. In other words, despite the progress in moving to the motor assisting in halting the vehicle, there is a need for a passive force emulator to provide a haptic feel to the operator when a pedal is depressed.

SUMMARY

A $1^{st}$ aspect of the disclosure, either alone or in combination with any other aspect herein concerns an emulator assembly including: a pedal assembly including a pedal arm configured to move based on a load applied thereon; a housing including: a first housing member having: a first cavity; and a pushrod operably connected to the pedal arm and to the first housing member; a first cradle positioned within the first cavity and operably movable in a longitudinal direction, the first cradle including a second cavity; a first pair of springs positioned to extend within the second cavity; a second housing member having a third cavity, a portion of the first housing member and a portion of the first cradle received within the third cavity of the second housing member to move in the longitudinal direction with respect to the second housing member based on the load; a second pair of springs having a proximal end and an opposite distal end, the second pair of springs positioned to extend within the second cavity and the third cavity such that the proximal end of the second pair of springs are configured to engage with the first cradle; and an end cap coupled to the second housing member and having an interior surface, the distal end of the second pair of springs configured to engage with the interior surface, wherein when a first predetermined load is applied to the pedal arm, the pushrod moves which drives the first cradle against the first pair of springs such that at least a compression energy by the first pair of springs generates a first force feedback onto the pedal arm.

A $2^{nd}$ aspect of the disclosure, either alone or in combination with any other aspect herein concerns the emulator assembly of the $1^{st}$ aspect, further including a second cradle positioned within the second cavity, the first pair of springs positioned to extend within the second cavity between the first cradle and the second cradle; and the second pair of springs positioned to extend within the second cavity and the third cavity and between the second cradle and the interior surface of the end cap.

A $3^{rd}$ aspect of the disclosure, either alone or in combination with any other aspect herein concerns the emulator assembly of the $2^{nd}$ aspect, wherein the interior surface of the end cap includes a receiving recess configured to receive and retain the distal end of the second pair of springs.

A $4^{th}$ aspect of the disclosure, either alone or in combination with any other aspect herein concerns the emulator assembly of the $2^{nd}$ aspect, wherein when a second predetermined load is applied to the pedal arm, the pushrod further moves in the longitudinal direction which drives the first cradle towards the interior surface of the end cap in the longitudinal direction and the second cradle towards an inner surface of the first cradle at a proximal end of the first cradle in the longitudinal direction.

A $5^{th}$ aspect of the disclosure, either alone or in combination with any other aspect herein concerns the emulator assembly of the $4^{th}$ aspect, wherein when the second predetermined load is applied to the pedal arm, the first pair of springs are compressed and the second pair of springs are at least partially compressed to generate a second force feedback onto the pedal arm.

A $6^{th}$ aspect of the disclosure, either alone or in combination with any other aspect herein concerns the emulator assembly of the $5^{th}$ aspect, wherein the second predetermined load is greater than the first predetermined load and the second force feedback has a greater force than the first force feedback.

A $7^{th}$ aspect of the disclosure, either alone or in combination with any other aspect herein concerns the emulator assembly of the $6^{th}$ aspect, wherein when a third predetermined load is applied to the pedal arm, the pushrod further moves which further drives the first cradle in the longitudinal direction such that the first cradle abuts the interior surface of the end cap and such that the second pair of springs are further compressed to generate a third force feedback onto the pedal arm.

An $8^{th}$ aspect of the disclosure, either alone or in combination with any other aspect herein concerns the emulator assembly of the $7^{th}$ aspect, wherein when the third predetermined load is applied to the pedal arm, the second cradle is moved to abut the inner surface of the first cradle at the proximal end of the first cradle in the longitudinal direction.

A $9^{th}$ aspect of the disclosure, the third predetermined load is greater than the second predetermined load and the third force feedback has a greater force than the second force feedback.

A $10^{th}$ aspect of the disclosure, either alone or in combination with any other aspect herein concerns the emulator assembly of the $1^{st}$ aspect, wherein the first pair of springs are coaxially aligned such that one of the first pair of springs is positioned within an inner diameter of the other one of the first pair of springs; and the second pair of springs are coaxially aligned such that one of the second pair of springs is positioned within an inner diameter of the other one of the second pair of springs.

An $11^{th}$ aspect of the disclosure, either alone or in combination with any other aspect herein concerns an emulator assembly, including a pedal arm configured to move based on a load applied thereon; a housing operably coupled to the pedal arm, the housing including: a first cradle positioned having a cavity and operably movable in a longitudinal direction; a first pair of springs positioned to extend within the cavity; a housing member having a second cavity, a portion of the first cradle received within the second cavity of the housing member to move in the longitudinal direction with respect to the housing member based on the load; a second pair of springs having a proximal end and an opposite distal end, the second pair of springs positioned to extend within the cavity and the second cavity such that the proximal end of the second pair of springs are configured to engage with the first cradle; and an end cap coupled to the housing member and having an interior surface, the distal end of the second pair of springs configured to engage with the interior surface, wherein when a first predetermined load is applied to the pedal arm, the first cradle is driven against the first pair of springs such that at least a compression energy by the first pair of springs generates a first force feedback onto the pedal arm.

A $12^{th}$ aspect of the disclosure, either alone or in combination with any other aspect herein concerns the emulator assembly of the $11^{th}$ aspect, further including a second cradle positioned within the cavity of the first cradle, the first pair of springs positioned to extend within the cavity between the first cradle and the second cradle; and the second pair of springs positioned to extend within the cavity and the second cavity and between the second cradle and the interior surface of the end cap.

A $13^{th}$ aspect of the disclosure, either alone or in combination with any other aspect herein concerns the emulator assembly of the $12^{th}$ aspect, wherein the interior surface of the end cap includes a receiving recess configured to receive and retain the distal end of the second pair of springs.

A $14^{th}$ aspect of the disclosure, either alone or in combination with any other aspect herein concerns the emulator assembly of the $12^{th}$ aspect, wherein when a second predetermined load is applied to the pedal arm, the first cradle further moves in the longitudinal direction towards the interior surface of the end cap and the second cradle towards an inner surface of the first cradle at a proximal end of the first cradle in the longitudinal direction.

A $15^{th}$ aspect of the disclosure, either alone or in combination with any other aspect herein concerns the emulator assembly of the $14^{th}$ aspect, wherein when the second predetermined load is applied to the pedal arm, the first pair of springs are compressed and the second pair of springs are at least partially compressed to generate a second force feedback onto the pedal arm.

A $16^{th}$ aspect of the disclosure, either alone or in combination with any other aspect herein concerns the emulator assembly of the $15^{th}$ aspect, wherein when the second predetermined load is applied to the pedal arm, the first pair of springs are compressed and the second pair of springs are at least partially compressed to generate a second force feedback onto the pedal arm.

A $17^{th}$ aspect of the disclosure, either alone or in combination with any other aspect herein concerns the emulator assembly of the $16^{th}$ aspect, wherein when a third predetermined load is applied to the pedal arm, the first cradle further moves in the longitudinal direction such that the first cradle abuts the interior surface of the end cap, the second pair of springs are further compressed to generate a third force feedback onto the pedal arm.

An $18^{th}$ aspect of the disclosure, either alone or in combination with any other aspect herein concerns the emulator assembly of the $17^{th}$ aspect, wherein when the third predetermined load is applied to the pedal arm, the second cradle is moved to abut the inner surface of the first cradle at the proximal end of the first cradle in the longitudinal direction.

A $19^{th}$ aspect of the disclosure, either alone or in combination with any other aspect herein concerns the emulator assembly of the $18^{th}$ aspect, wherein the third predetermined load is greater than the second predetermined load.

A $20^{th}$ aspect of the disclosure, either alone or in combination with any other aspect herein concerns the emulator assembly of the $19^{th}$ aspect, wherein the third force feedback has a greater force than the second force feedback.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 11:
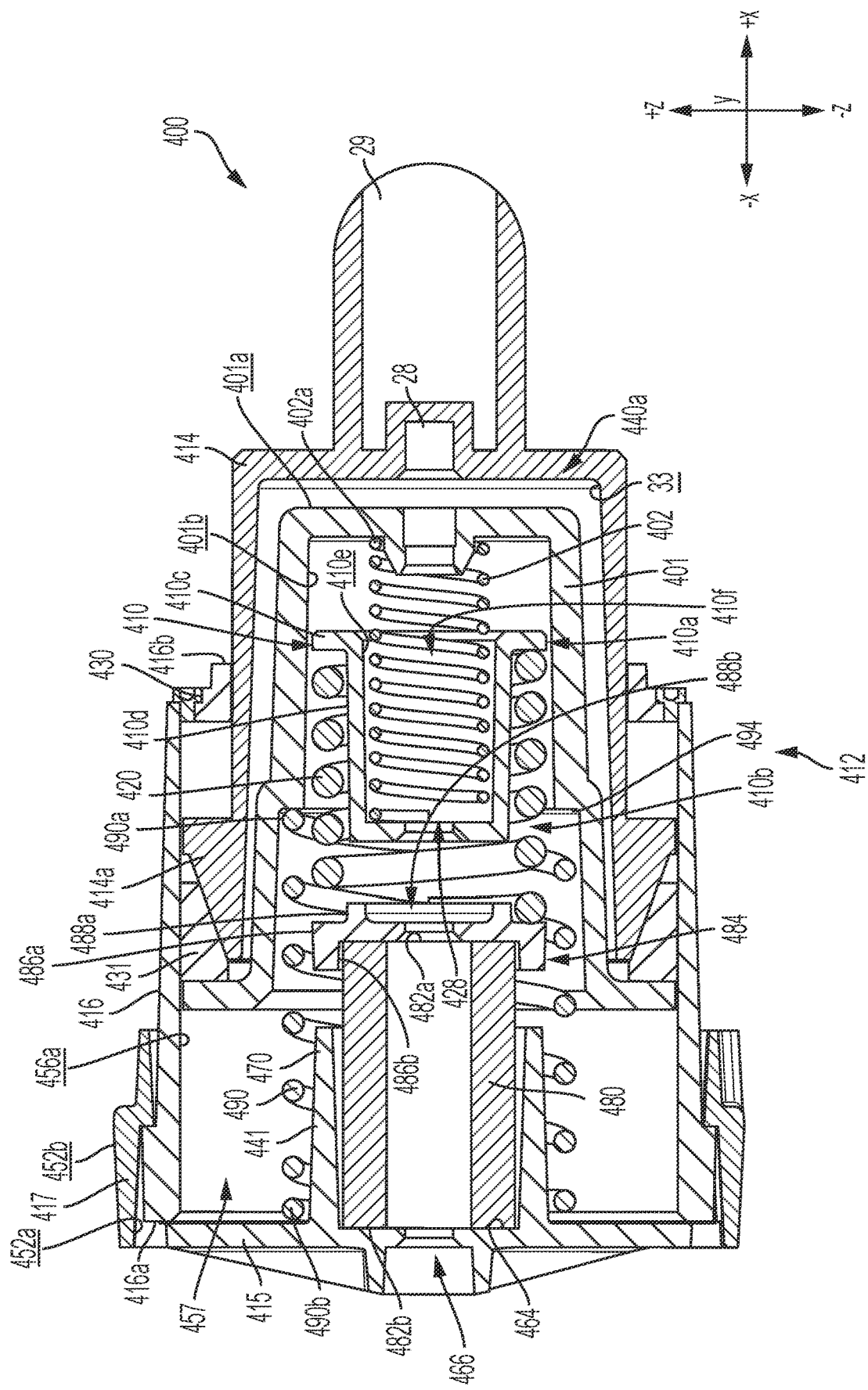
FIG. 11 schematically depicts a cross-sectional view of the second embodiment of the emulator assembly of FIG. 10 with a second predetermined force applied to a pedal pad according to one or more embodiments shown and described herein.
Figure 12:
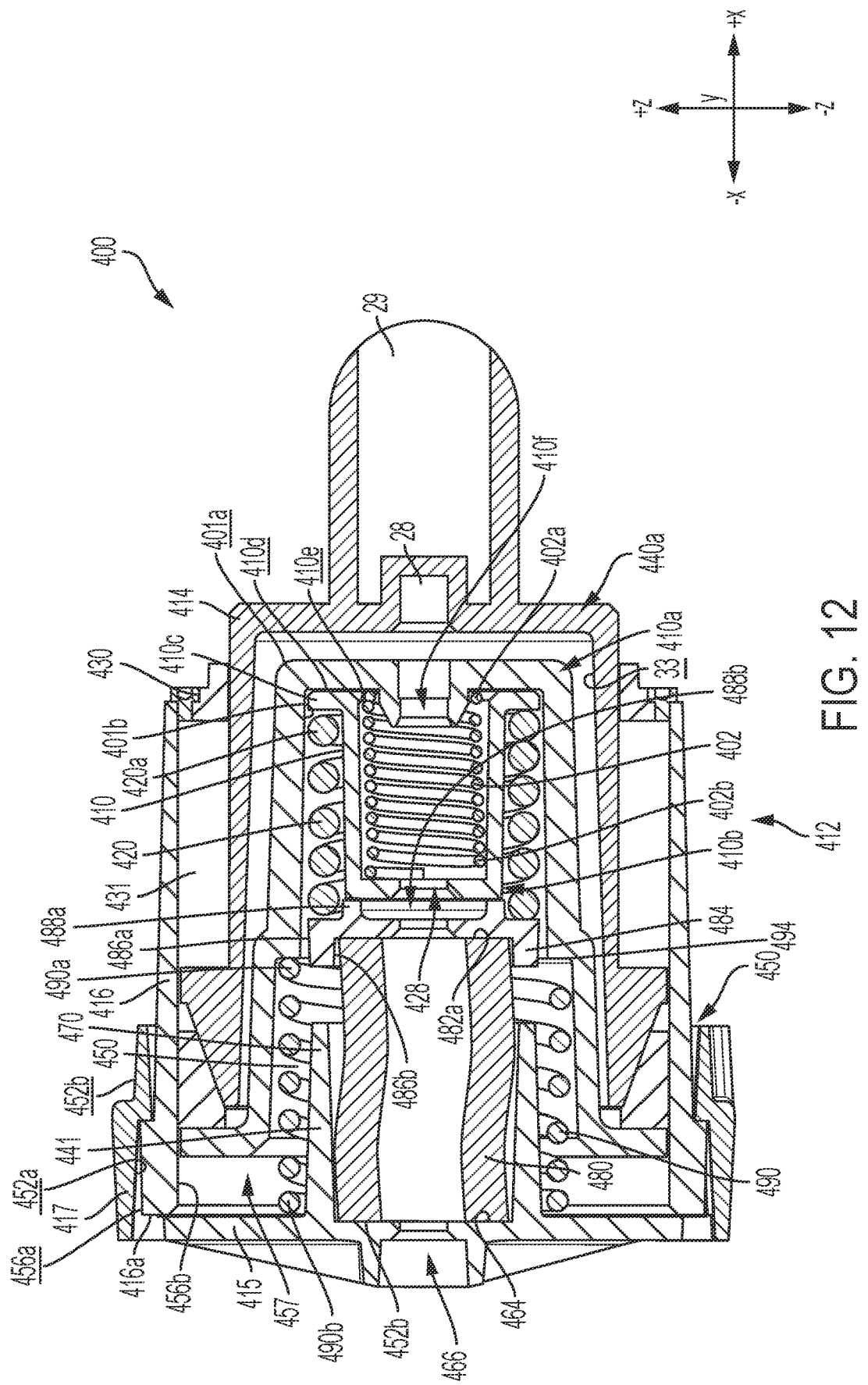
FIG. 12 schematically depicts a cross-sectional view of the second embodiment of the emulator assembly of FIG. 10 with a third predetermined force applied to a pedal pad according to one or more embodiments shown and described herein.
Figure 13:
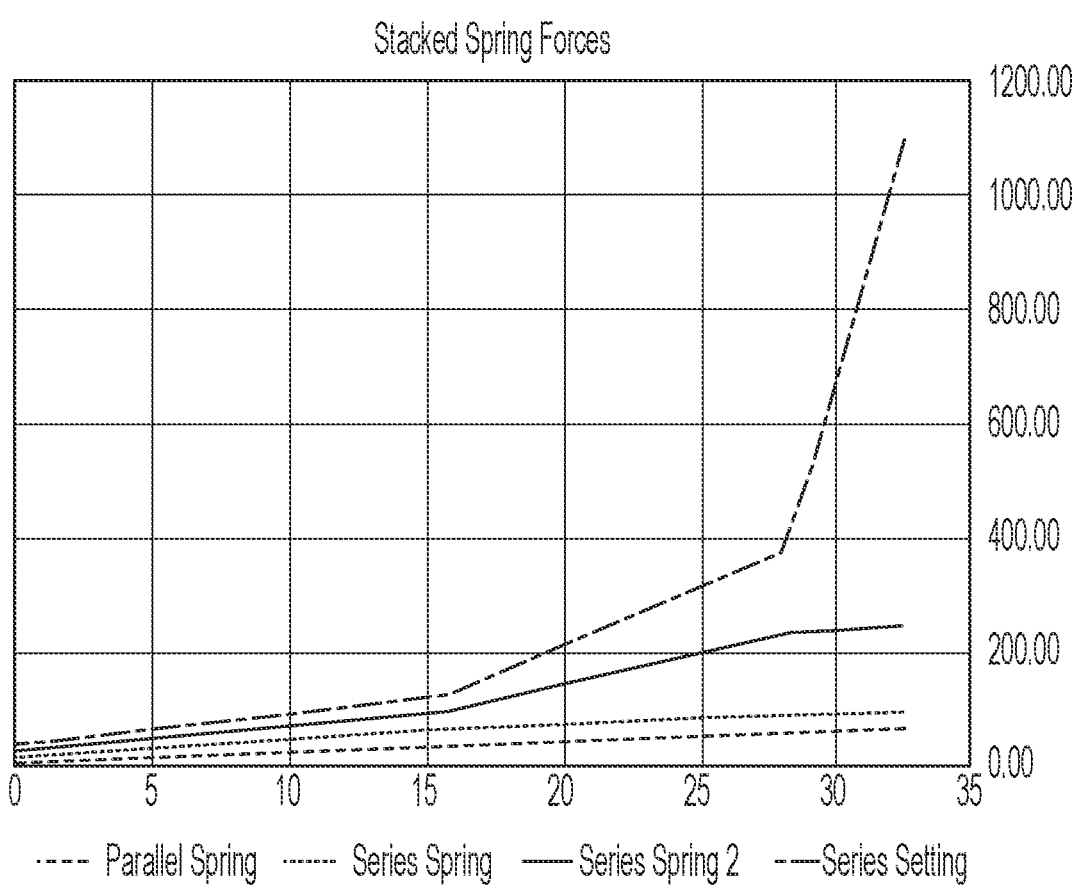
Figures 16, 17:
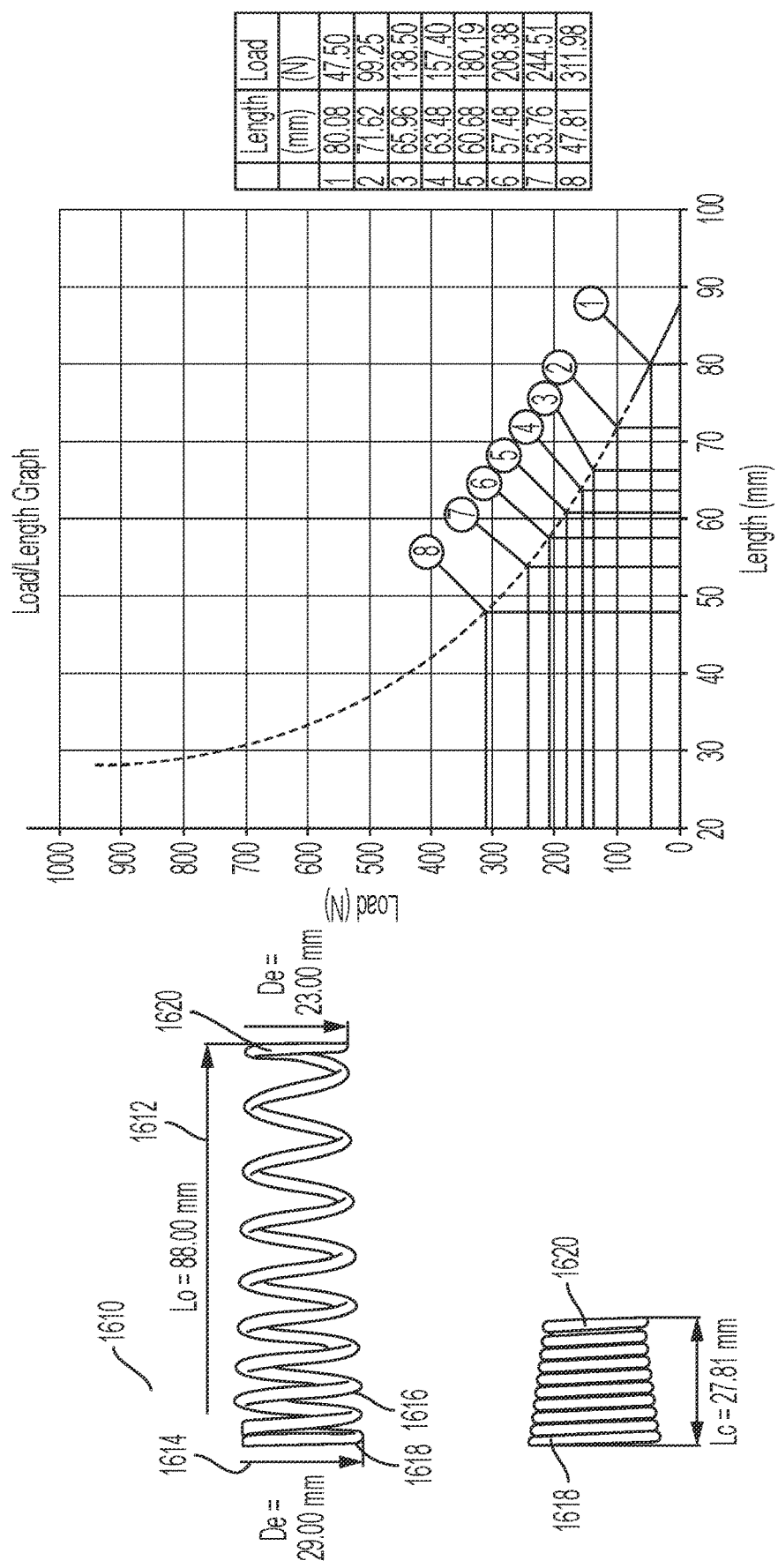

FIG. 13 schematically depicts an illustrative example graph of a stack spring force of the second embodiment of the emulator assembly of FIGS. 10-13 according to one or more embodiments shown and described herein;

FIG. 14 schematically depicts a third embodiment of a emulator assembly according to one or more embodiments shown and described herein;

FIG. 15 schematically depicts a partial cross sectional view of the emulator assembly of FIG. 14 in a partial compression state according to one or more embodiments shown and described herein;

FIG. 16 schematically depicts a second aspect of a coil spring according to one or more embodiments shown and described herein; and FIG. 17 schematically depicts an illustrative example graph of the second aspect of a coil spring of FIG. 16 at various compressions according to one or more embodiments shown and described herein.

DETAILED DESCRIPTION

A Brake Pedal Emulator (BPE) is an overall device that takes the place of a conventional brake pedal and other hardware from a combustion engine and is be used on an Electromechanical Braking System where there is no direct mechanical or hydraulic connection between the brake pedal and the calipers. The BPE inputs are typically force and travel distance of the pedal from the driver's foot, reference voltage for all sensors, ground for all sensors, and reaction loads at all fastening points. The resulting BPE outputs include force feedback and/or resistance to driver's foot as a function of travel and speed, multiple pedal position sensor outputs as a function of travel, and error codes relating to the sensor outputs. Optional functions include the conditioning of the output signals to match or closely match to the vehicle the driver's intended braking input signal, or the intended rate of braking in direct or near-direct relation to the speed and force with which the drive depresses the brake pedal. The intention is that the BPE behaves for the driver as closely as possible as a conventional braking system in terms of pedal feel and deceleration performance.

The BPE may be located in the passenger compartment in a driver's footwell area. The BPE needs to meet the same mechanical loads as conventional pedal assemblies and must behave in a similar way as the conventional pedal. For example, the BPE needs to behave similar to conventional pedals when respect to applying loads, lateral loads, reverse loads vs. deflections and plastic deformation.

Conventional brake pedal assemblies include a pedal mounting bracket with a pivotally attached pedal arm/lever that has certain pedal force characteristics that need to be met during the apply stroke of the pedal. As such, the BPE needs to be configured to meet these same certain pedal force characteristics. Further, in some embodiments, the BPE may also include a downstop for the brake pedal stroke. Additionally, the BPE needs to be configured to withstand panic braking loads.

The BPE assemblies disclosed herein meet the following criteria: The BPE fails functional such that upon any failure, the driver is permitted to operate the braking system by applying the pedal and provide an appropriate sensor signal output. The BPE is configured to withstand foreseeable conditions and abuse a pedal will take. The BPE is scalable to automotive volume series production and be cost effective to manufacture and assemble.

The present disclosure provides for a pedal emulator system that uses a spring or a series of springs to provide a resistance force that allows a user to feel a sensation similar or equal to what is expected in depressing the brake pedal of a hydraulic system. In some aspects, the system includes an emulator module and sensors adapted to sense position and/or force of the pedal pad. The emulator is configured to simulate a braking fluid system, such as a hydraulic system.

Figure 1:
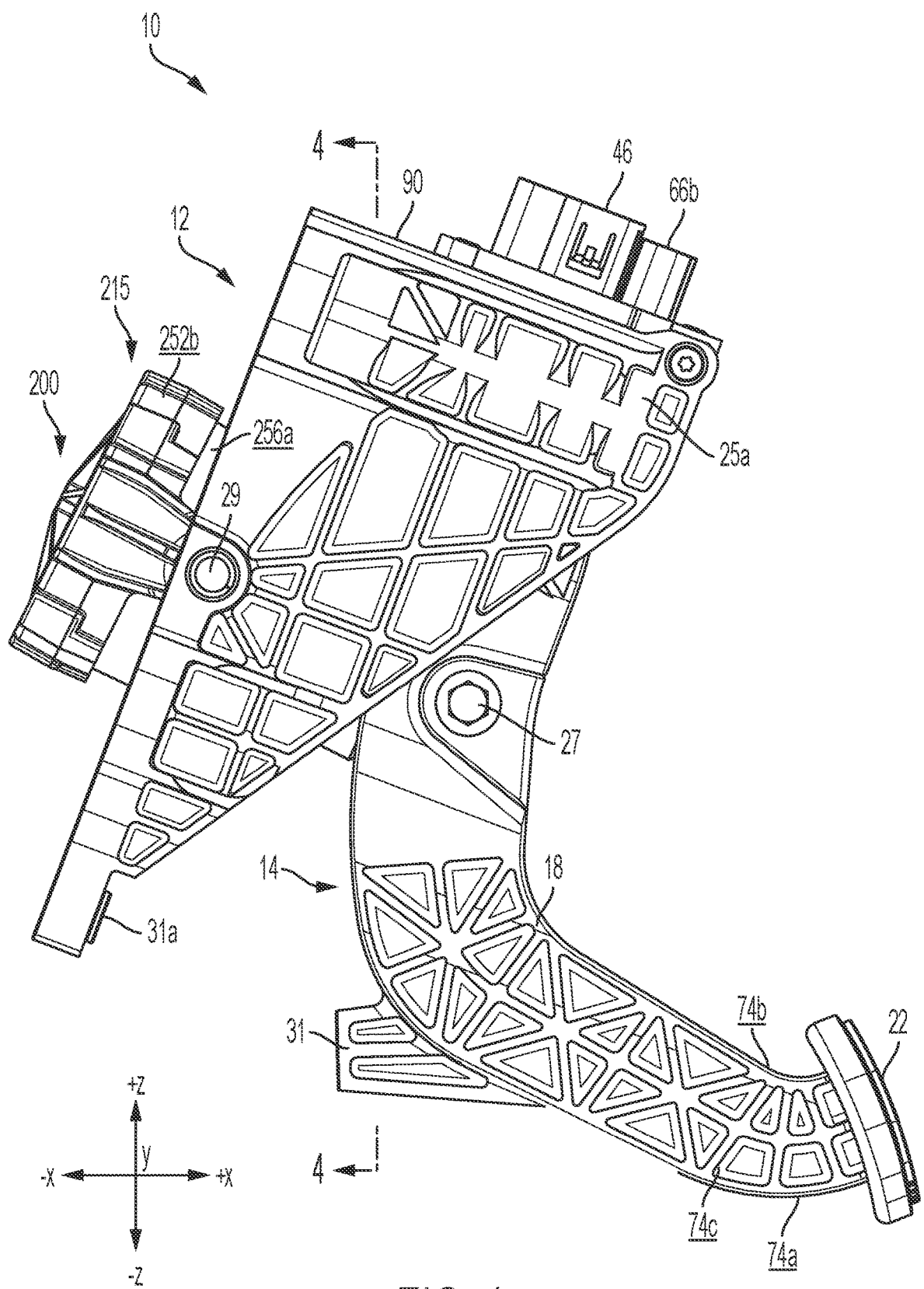
FIG. 1 schematically depicts a left-hand side view of a pedal assembly according to one or more embodiments shown and described herein.
Figure 2:
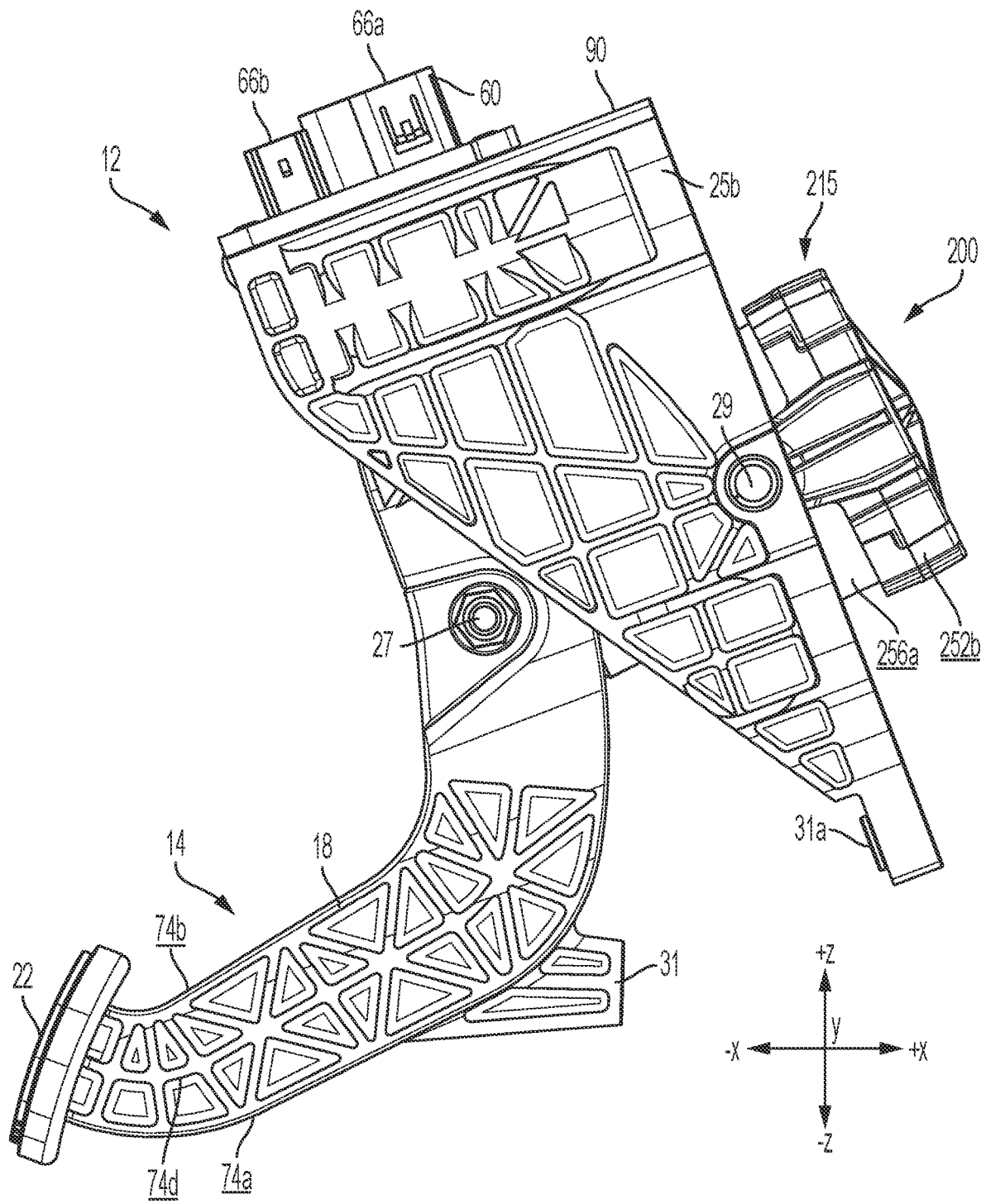
FIG. 2 schematically depicts a right-hand side view of the pedal assembly of FIG. 1 according to one or more embodiments shown and described herein.
Figure 3:
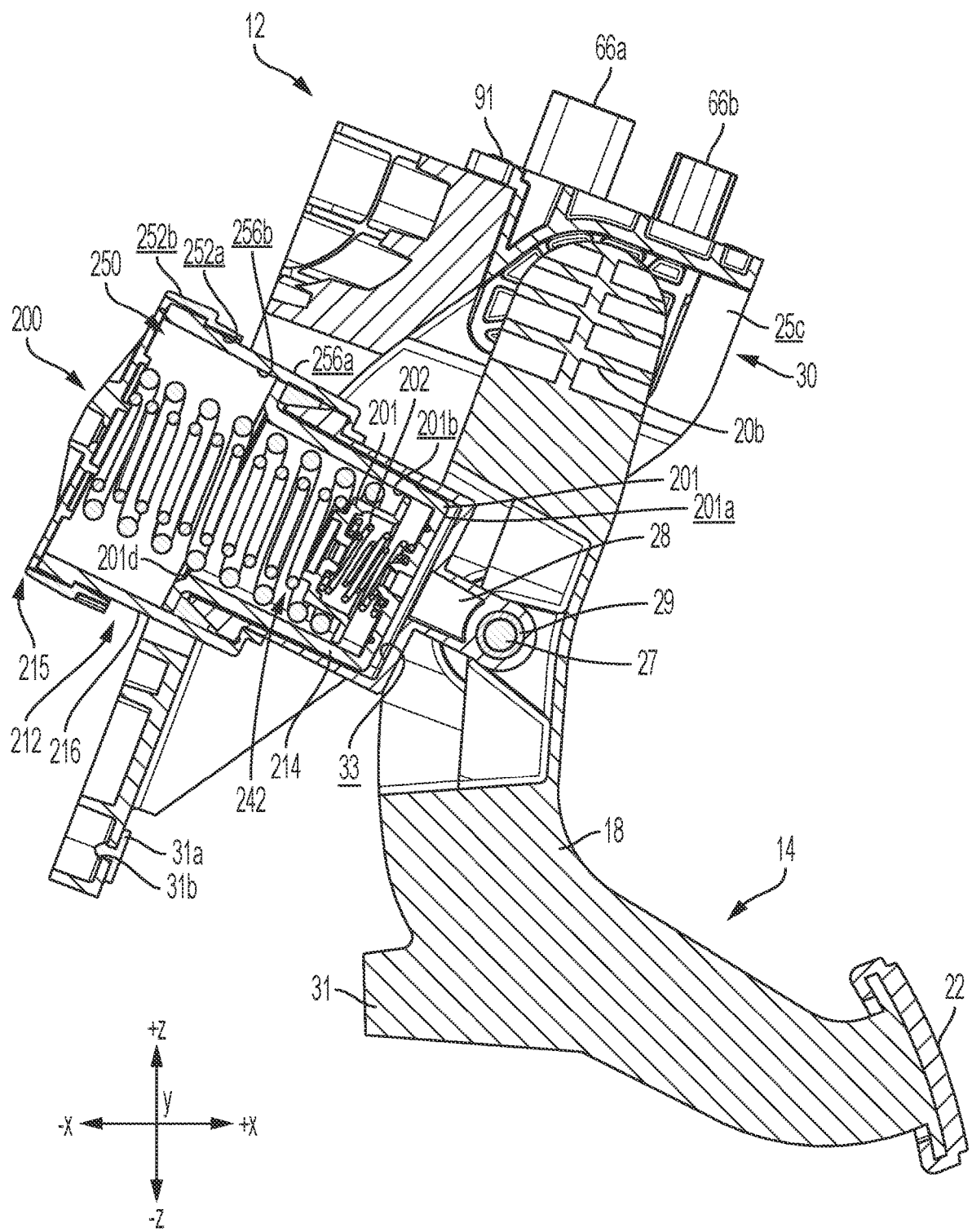
FIG. 3 schematically depicts a cross-sectional view of the pedal assembly of FIG. 1 taken from the line 4-4 of FIG. 1 according to one or more embodiments shown and described herein.

As used herein, the term "longitudinal direction" refers to the forward-rearward direction of the assembly (i.e., in the +/−X-direction depicted in FIG. 1). The term "lateral direction" refers to the cross-assembly direction (i.e., in the +/−Y-direction depicted in FIG. 1), and is transverse to the longitudinal direction. The term "vertical direction" or "below" or "above" refer to the upward-downward direction of the assembly (i.e., in the +/−Z-direction depicted in FIG. 1).

As used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a non-conductive medium, data signals wirelessly and/or via conductive medium or a non-conductive medium and the like.

Referring generally to FIGS. 1-4, a pedal assembly 10 is schematically depicted. The pedal assembly 10 includes a housing 12, a pedal arm assembly 14, and a first example emulator assembly 200. The pedal arm assembly 14 includes a pedal arm 18, which includes a pedal pad end 20a and a pivot end 20b. Further, the pedal arm 18 includes a first surface 74a, an opposite second surface 74b and a pair of side surfaces 74c, 74d that define a thickness of the pedal arm 18. The pivot end 20b is pivotally coupled to the housing 12 about a pivot axis P1 in the direction indicated by arrow $A_1$. The pedal pad end 20a receives a pedal pad 22 that a foot of a user would depress against to brake, accelerate, and/or activate a clutch control.

The pedal arm assembly 14 is movably coupled to the housing 12 at the pivot end 20b, allowing the pedal arm assembly 14 to move, such as by pivoting or rotating, with respect to the housing 12. The pedal arm assembly 14 includes a connection device 27 for coupling a pushrod 28, or other coupling device of the first example emulator assembly 200 to the pedal arm 18. The connection device 27 may include an elongated member 27a, a bushing 27b, and/or retainer 27c configured to a bore 29 of the pushrod 28 positioned at a proximal end closest to the pedal arm 18 to couple the first example emulator assembly 200 to the pedal arm 18. As such, the connection device 27 may be a fastener such as a bolt and nut, screw, rivet, weld, epoxy, adhesive, and the like. The housing 12 may also house, hold, or otherwise provide a coupling portion for first example emulator assembly 200. As the pedal arm assembly 14 moves in response to a user's applied pressure, the movement at the pivot end 20b about P1 in the direction of arrow A1, allows the pushrod 28 to move further in a longitudinal direction (i.e., in the +/−X direction) into the housing 12. As explained in greater detail herein, the pushrod 28 is operably connected to the first example emulator assembly 200. In some aspects, the pedal arm assembly 14 may include a protrusion 31 that is configured as a stop arm to contact an elastomer 31a housed in a recess 31b of the housing 12 and cease the motion of the pedal arm assembly 14 by a user after a predetermined force has been applied. As such, travel in the longitudinal direction (i.e., in the +/−X direction) would be stopped.

The pedal arm 18 may be a molded plastic. For example, the pedal arm 18 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like. In other embodiments, the pedal arm 18 may take on any shape, whether regular or irregular, and may be formed via injection molding techniques, additive manufacturing techniques (e.g., three-dimensional printing), and the like.

The housing 12 may include a pair or two outer sidewalls 25a, 25b with a cavity 30 therebetween. The pedal arm assembly 14 is fed into the cavity 30 and connected to the interior surfaces 25c, 25d of the outer sidewall 25b to establish the pivot end 20b. It will be understood that in some aspects, the pivot end 20b can be established with either sidewall 25a or 25b, or both. In some aspects, the housing 12 is a single unit. In other aspects, the housing 12 is assembled from two or more pieces.

In some aspects, the housing 12 includes a two-connector assembly formed within an upper wall portion 90. In some aspects, the upper wall portion 90 is defined with two different wall portions 91, 92. Each of the wall portions 91, 92 may assist in retaining or otherwise locking the pivot end 20b of the pedal arm 18 into the housing 12 such that the pivot end 20b pivots, or moves, about the wall portions 91, 92. Each of the two different wall portions 91, 92 may be received by a recess portion 32 of the interior surface 25c, 25d of the sidewalls 25a, 25b, respectively, to retain or otherwise hold the wall portions 91, 92 into position. Each of the wall portions 91, 92 may provide a cover or top wall over the cavity 30 of the housing 12. Further, the upper wall portion 90 may be removably with respect to the sidewalls 25a, 25b of the housing 12.

Figure 4:
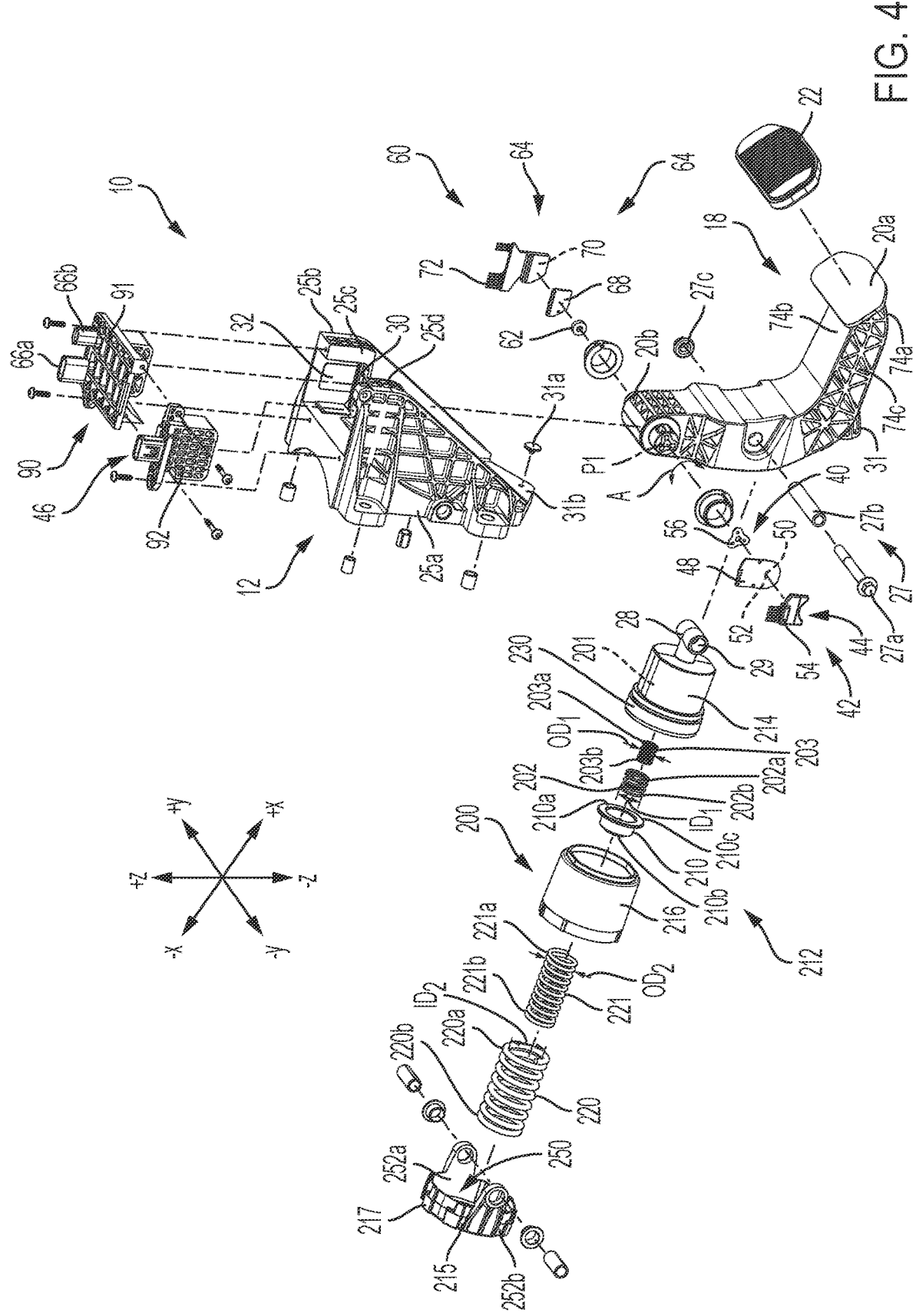
FIG. 4 schematically depicts an exploded view of a first embodiment of an emulator assembly of the pedal assembly of FIG. 11 according to one or more embodiments shown and described herein.

The housing 12 may include a first sensing assembly 42 for detecting a movement of a coupler 40 positioned at the pivot end 20b of the pedal arm 18 using inductive sensing technology. In some embodiments, the first sensing assembly 42 is positioned to be at least partially incorporated with the wall portion 92, which may include a printed wiring assembly 44 and a connector housing 46. The printed wiring assembly 44 may include a circuit board 48 (or a printed circuit board), which may include at least one receiver coil 50, a transmitter coil 52, and a plurality of terminal pins 54 extending therefrom. The coupler 40 may be mounted or attached to the pivot end 20b of the pedal arm 18 in the vicinity of and perpendicular to the pivot axis P1. As such, the coupler 40 may be positioned adjacent to the at least one receiver coil 50. In some embodiments, the coupler 40 may include distinct lobes 56 such as three lobes as illustrated in FIG. 4. This is non-limiting and the coupler 40 may have more or less lobes, be circular, or other shapes, such as a half-moon, square, rectangular, and/or the like. The coupler 40 may rotate or pivot upon a load applied to the pedal pad 22, which moves or pivots the pedal arm 18.

The at least one receiver coil 50 and the transmitter coil 52 may detect the movements of the coupler 40 and that data is transmitted to an electronic control unit and/or powertrain controller communicatively coupled to the first sensing assembly 42 via the plurality of terminal pins 54 extending within the connector housing 46. Portions of the first sensing assembly 42 may include overmold to encapsulate the electronic components, as best illustrated by the wall portion 92 in FIG. 4, and it may include solderless connections between the printed wiring assembly 44 and plurality of terminal pins 54, such as compliant through-hole pins.

The housing 12 may further include a second sensing assembly 60 for detecting a movement of a at the pivot end 20b of the pedal arm 18 and is positioned to be at least partially incorporated with the wall portion 91. In some aspects, the second sensing assembly 60 is provided for detecting a movement of a magnet 62 using Hall Effect technology. In some embodiments, the second sensing assembly 60 includes a printed wiring assembly 64 and a pair of connector housings 66a, 66b that may be incorporated within the wall portion 91. The printed wiring assembly 64 may include a circuit board 68, which may include at least one Hall Effect chip 70 and a plurality of terminal pins 72 extending therefrom. The at least one Hall effect chip 70 is sensitive to a Hall effect detection of magnetic change, and to convert a displacement or angular measurement of a coupler, such as the magnet 62, to an electronic or electromagnetic signal. This information is transmitted through the plurality of terminal pins 72 and to the electronic control unit and/or the powertrain controller for processing.

The magnet 62 may be mounted or attached to the second side surface 74c of the pedal arm 18 at the pivot end 20b in the vicinity of and perpendicular to the pivot axis P1. As such, the magnet 62 may be positioned adjacent to the at least one Hall Effect chip 70. In some embodiments, the magnet 62 may be generally circular, as illustrated in FIG. 4. In other embodiments, the magnet 62 may be a plurality of other shapes, such as rectangular, square, hexagonal, octagonal, and/or the like. The magnet 62 may rotate or pivot upon movement of the pedal pad 22 of the pedal arm 18.

The at least one Hall effect chip 70 detects the movements of the magnet 62 and that data is transmitted to the electronic control unit and/or powertrain controller communicatively coupled to the second sensing assembly 60 via the plurality of terminal pins 72 extending within the connector housing 66a, 66b. Portions of the second sensing assembly 60 may include overmold to encapsulate the electronic components, and it may include solderless connections between the printed wiring assembly 64 and plurality of terminal pins 72, such as compliant through-hole pins.

It should be understood that the first sensing assembly 42 and the second sensing assembly 60 simultaneously measure the movement of the pivot end 20b of the pedal arm 18 such that redundant sensing may occur. Further, the redundant sensing described herein uses different sensing techniques, which provide for a more robust redundant sensing compared to conventional systems.

In the depicted embodiment, the housing 12 is configured as a hanging assembly to be mounted the vehicle spaced apart from a floor surface of the vehicle. In other embodiments, the housing 12 may be floor mounted. That is, in some embodiments, the housing 12 may be coupled or mounted to be positioned within or extending from the floor surface of a vehicle.

Referring now to FIGS. 3-7, the first example emulator assembly 200 includes a housing 212 through which the pushrod 28 can move linearly in the longitudinal direction (i.e., in the +/−X direction). Positioned within the housing 212 is a first cradle 201, a first biasing member such as a first spring 202, a first redundant biasing member such as a first redundant spring 203, a second cradle 210, a second biasing member such as a second spring 220, a second biasing member such as a second redundant spring 221, and an end cap 215. As discussed in greater detail herein, this is non-limiting, and the first example emulator assembly 200 may include a third spring and/or an elastomer in further embodiments.

The first cradle 201 may include an outer surface 201a and an opposite inner surface 201b at a proximal end 240a and may be open, or without a surface at a distal open end 240b that may be surrounded by a rim or lip 201c. That is, the rim or lip 201c may circumferentially surround the distal open end 240b such that there is a cavity 242 extending from the distal open end 240b to the proximal end 240a defined by the inner surface 201b. As illustrated, the outer surface 201a may face and, depending on a load applied to the pedal, may abut an inner surface 33 of the pushrod 28 such that the pushrod 28 defines or forms a first housing member 214, or plunger, as discussed in greater detail herein.

That is, the housing 212 may include the first housing member 214 and a second housing member 216 and the end cap 215. The end cap 215 may include a sidewall 217 that is curvilinear to cup, or receive at least a portion of the second housing member 216 within a cavity 250 that may be defined by an interior surface 252a opposite an exterior surface 252b of the sidewall 217. The interior surface 252 may further include at least one receiving recess 264 and an aperture 266 extending therethrough to provide access to a cavity 257 of the second housing member 216, as discussed in greater detail herein.

The second housing member 216 may include a distal end 216a and an opposite proximal end 216b with the distal end 216a positioned closest to the interior surface 252a of the end cap 215. Further, the second housing member 216 includes an exterior surface 256a and an opposite interior surface 256b and the cavity 257 extending between the distal end 216a and the proximal end 216b. The exterior surface 256a of the second housing member 216 abuts with, engages, or may otherwise be in communication with portions of the interior surface 252a of the sidewall 217 of the end cap 215.

A distal end 216a of the second housing member 216 is in contact with the interior surface 252a of the end cap 215. The first housing member 214 is configured to move or collapse into the second housing member 216 in the longitudinal direction (i.e., in the +/−X direction) based on an amount of force applied to the pedal arm 18, as discussed in greater detail herein. An annular ring 230 may be positioned to circumferentially surround the first housing member 214 to inhibit or prevent the first housing member 214 and the second housing member 216 from separating. Optionally, in the depicted embodiments, a friction ring 231 may be positioned to circumferentially surround a portion of the interior surface 256b between the annular ring 230 and the rim or lip 201c of the distal open end 240b of the first cradle 201 to add further resistance between the first housing member 214 and the second housing member 216 as the first housing member 214 collapses into the second housing member 216. The friction ring 231 may be tapered or angled. The friction ring 231 may be formed of a rubber material, elastomer material, epoxy, and/or the like.

The first spring 202 includes a proximal end 202a and a distal end 202b and an inner diameter ID1. The second cradle 210 includes a proximal end 210a and an opposite distal end 210b. A flange 210c extends from the proximal end 210a and may be circumferential in shape to surround the proximal end 210a. The second cradle 210 further includes an outer surface 210d and an opposite inner surface 210e. A cavity 210f extends from proximal end 210a to the distal end 210b and is defined by the inner surface 210e and the flange 210c may be defined by the outer surface 210d. The distal end 203b of the first spring 202 may abut, engage, or otherwise be in contact with the inner surface 210e at the distal end 210b of the second cradle 210. The proximal end 202a of the first spring 202 may abut, engage, or otherwise be in contact with the inner surface 201b at the proximal end 240a of the first cradle 201. A protrusion 210g may extend from the outer surface 210d at the distal end 210b and the protrusion 210g may include an aperture 248 permitting access to the cavity 210f.

The first redundant spring 203 includes a proximal end 203a and a distal end 203b and is of a diameter OD1. The diameter OD1 of the first redundant spring 203 is less than the inner diameter ID1 of the first spring 202 such that the first redundant spring 203 is received within the inner diameter ID1 of the first spring 202 such that the first spring 202 and the first redundant spring 203 are coaxially aligned, thereby providing a first pair of springs. The proximal end 203a of the first redundant spring 203 similarly is configured to abut, engage, or otherwise be in contact with the inner surface 201b at the proximal end 240a of the first cradle 201. The distal end 203b of the first redundant spring 203 similarly may abut, engage, or otherwise be in contact with the inner surface 210e at the distal end 210b of the second cradle 210.

The second cradle 210 may independently move or float within the cavity 242 between the distal open end 240b and the proximal end 240a, dependent on an amount of force applied to the pushrod 28 from the pedal arm 18, as discussed in greater detail herein. As such, the second cradle 210 may be positioned to slidably engage with or otherwise move, ride against, or the like, against the inner surface 201b of the first cradle 201. In some embodiments, the outer surface 210d of the flange 210c may of the second cradle 210 may slidably engage with or otherwise move, ride against, or the like, against the inner surface 201b of the first cradle 201.

The second spring 220 includes a proximal end 220a and an opposite distal end 220b and an inner diameter ID2. The second redundant spring 221 similarly includes a proximal end 221a and an opposite distal end 221b and has an outer diameter OD2. The outer diameter OD2 of the second redundant spring 221 is less than the inner diameter ID2 of the second spring 220 such that the second redundant spring 221 is received within the inner diameter ID2 of the second spring 220 such that the second spring 220 and the second redundant spring 221 are coaxially aligned.

The proximal end 220a of the second spring 220 is configured to abut, engage with, or otherwise be in contact with the outer surface 210d of the flange 210c of the second cradle 210. The proximal end 221a of the second redundant spring 221 is configured to abut, engage with, or otherwise be in contact the outer surface 210d of the distal end 210b of the second cradle 210, thereby providing a second pair of springs. In some embodiments, the proximal end 221a of the second redundant spring 221 may be coaxially aligned with protrusion 210g extending from the outer surface 210d of the distal end 210b of the second cradle 210 such that the proximal end 221 a of the second redundant spring 221 circumferentially surrounds the protrusion 210g. The distal end 220b of the second spring 220 and the distal end 221b of the second redundant spring 221 may be received with the at least one receiving recess 264 of the interior surface 252a of the end cap 215.

As such, the second spring 220 may reside fully within the first cradle 201. The first spring 202 and the first redundant spring 203 may reside fully within the second cradle 210. The second redundant spring 221 may be compressed between the second cradle and the end cap 215.

As discussed herein, the housing 212 includes the first housing member 214 configured to be telescopically positioned to longitudinally move (i.e., in the +/−X direction) relative to the second housing member 216. The pushrod 28 is telescopically positioned in communication with the first housing member 214. In some aspects, the housing 212 includes two, three, or more springs. In some aspects, each spring is provided as a pair of springs wherein each spring includes a duplicate spring energy (e.g., kinetic and/or potential) thereof. For example, the first spring 202 may have the first redundant spring 203 either placed within the coils of the first spring 202, placed around the coils of the first spring 202 or positioned next to the first spring 202. A redundant spring is present to provide the same function as the spring for which it duplicates and/or is redundant thereof. The second redundant spring 221 would therefore correspond to the second spring 220 and a third duplicate spring (not shown) would correspond to a third spring, and so on. It should be understood that the redundant spring is included as a failsafe for the first example emulator assembly 200.

As such, the redundant spring will compress with the same properties as the spring which it duplicates, and/or is redundant thereof. That is, the first redundant spring 203 compresses with the same force and outputs the same compression energy as the first spring 202 and so on. Accordingly, when as user applies force to the pedal arm 18 of the first example emulator assembly 200, the first spring 202 and the first redundant spring 203 may compress equally and output a similar compression energy. Further, in the event that the first spring 202 is compromised, such as through a material failure or a fracture, the first redundant spring 203 remains in position to allow the first example emulator assembly 200 to perform in a desirable manner.

Figure 5:
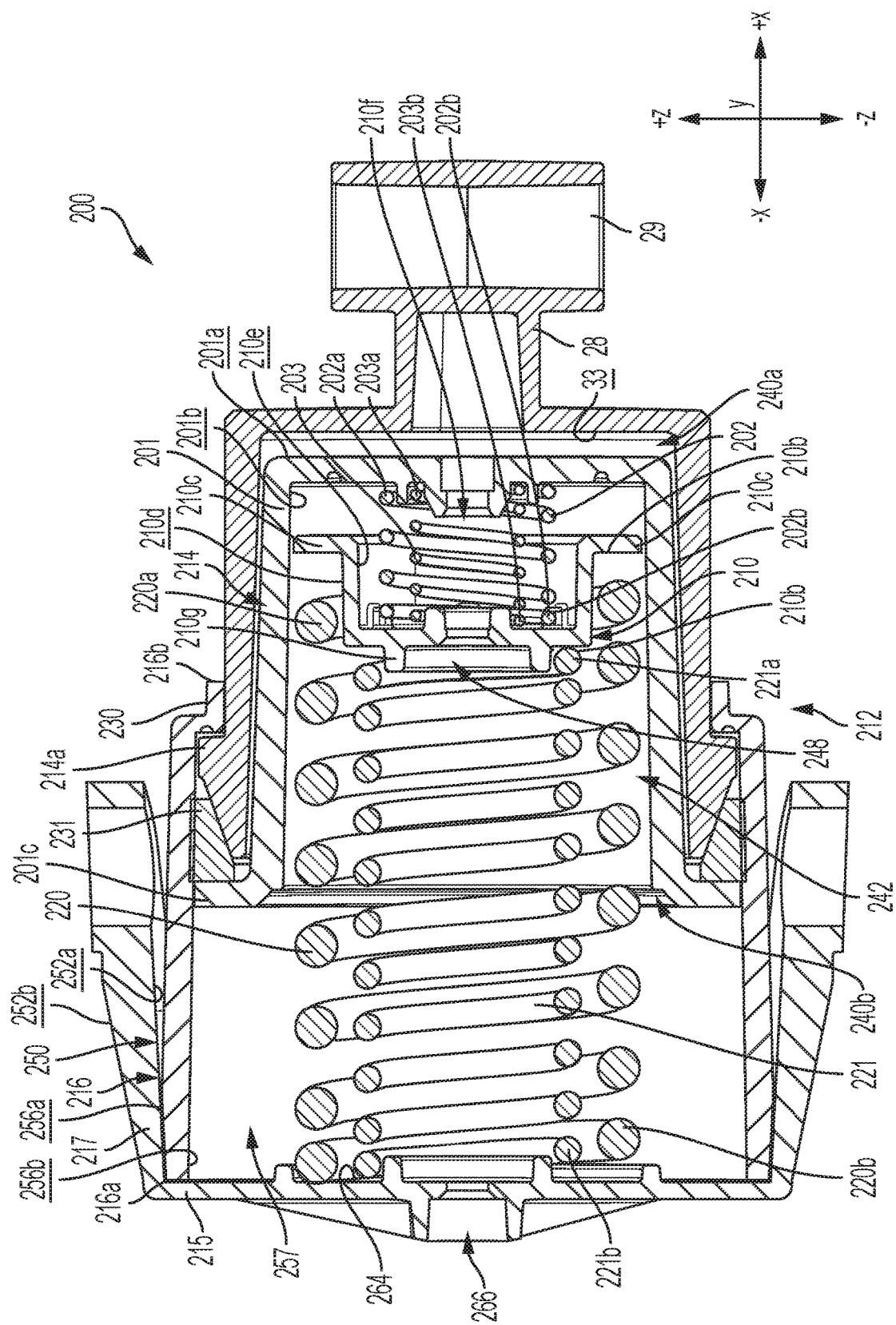
FIG. 5 schematically depicts a cross-sectional view of the first embodiment of the emulator assembly of the pedal assembly of FIG. 1 taken from the line 4-4 with a first predetermined force applied to a pedal pad according to one or more embodiments shown and described herein.

Referring now to FIG. 5, at rest, and/or with a first predetermined force applied to the pedal arm 18, the first spring 202 and the second spring 220 may be able to exert an outward force as long as the first spring 202 and the second spring 220 are not allowed to achieve equilibrium therein. The pushrod 28 engages the first housing member 214 to travel telescopically into the second housing member 216 in the longitudinal direction (i.e., in the +/−X direction). In operation when a first predetermined load is applied by a driver onto the pedal pad 22, the pushrod 28 is actuated linearly in the generally longitudinal direction (i.e., in the +/−X direction), with the pressure or force through the first spring 202 and the first redundant spring 203 against the inner surface 210e at distal end 210b of the first cradle 201. As the first spring 202 compresses in the longitudinal direction (i.e., in the +/−X direction), the first cradle 201 moves in the longitudinal direction (i.e., in the +/−X direction) to generate the first force feedback, illustrated by bracket 801 in FIG. 8.

Figure 6:
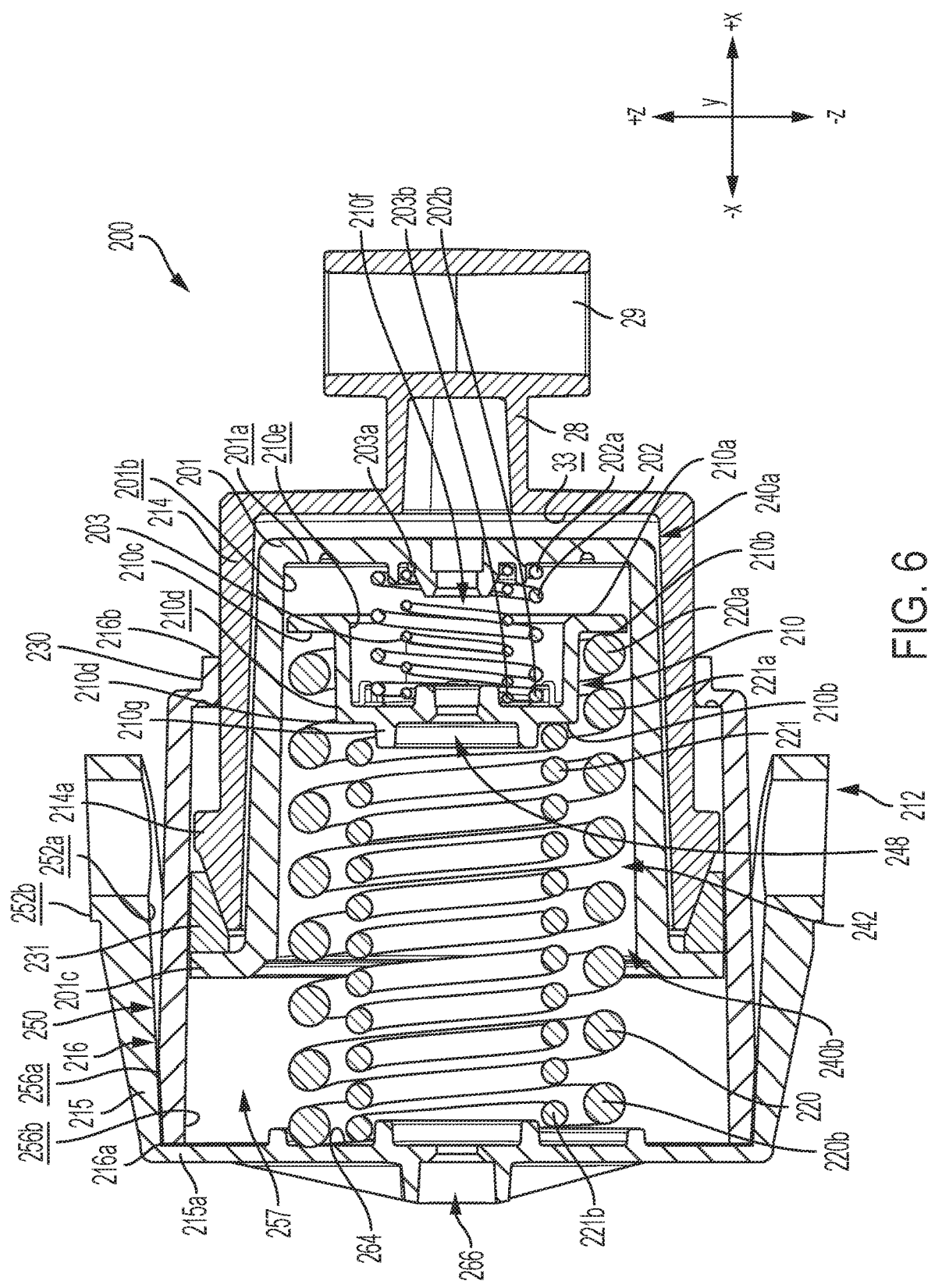
FIG. 6 schematically depicts a cross-sectional view of the first embodiment of the emulator assembly of FIG. 5 with a second predetermined force applied to a pedal pad according to one or more embodiments shown and described herein.

Now referring to FIG. 6, in some embodiments, upon a second predetermined load applied to the pedal pad 22, the second cradle 210 further moves within the coils of the second spring 220 through the proximal end 220a and the second redundant spring 221 in the longitudinal direction (i.e., in the +/−X direction). The outer surface 210d of the flange 210c engages the proximal end 220a of the second spring 220 of the second cradle 210 and the outer surface 210d of the distal end 210b of the second cradle 210 engage with the proximal end 221a of the second redundant spring 221. The distal end 220b of the second spring 220 and the distal end 221b of the second redundant spring 221 are positioned within the at least one receiving recess 264 of the end cap 215 to engage with the at least one receiving recess 264 and/or the interior surface 252a causing the compression thereof, to generate the second force feedback, illustrated by bracket 802 in FIG. 8. The second predetermined load applied to the pedal pad 22 is a greater amount of force or load than the first predetermined load causing a greater distance of movement of the housing member 214. Further, the second force feedback generated and felt by the driver is a greater force than the first force feedback.

That is, the compression of the first spring 202 (and corresponding first redundant spring 203) into the second cradle 210 is achieved because the first cradle 201, via the pushrod 28, has moved toward the end cap 215 in the longitudinal direction (i.e., in the +/−X direction). The proximal end 202a and the distal end 202b of the first spring 202 have compressed to be have a length closer to one another (e.g., moved toward each other), as have the proximal end 203a and the distal end 203b of the first redundant spring 203. The first cradle 201 and the second cradle 210 have similarly had the distance between them reduced. The proximal end 220a of the second spring 220 is engaged with the outer surface 210d at the flange 210c of the second cradle 210. Further, the first housing member 214 has telescopically travelled into the second housing member 216, with the protrusion 214a moving away from the annular ring 230, in the longitudinal direction (i.e., in the +/−X direction). The first cradle 201 has also descended into the second housing member 216 in the longitudinal direction (i.e., in the +/−X direction) by the protrusion 214a driving against the friction ring 231 on the outer rim or lip 201c of the first cradle 201. The second spring 220 and/or the second redundant spring 221 may not yet to be substantially engaged.

Figure 8:
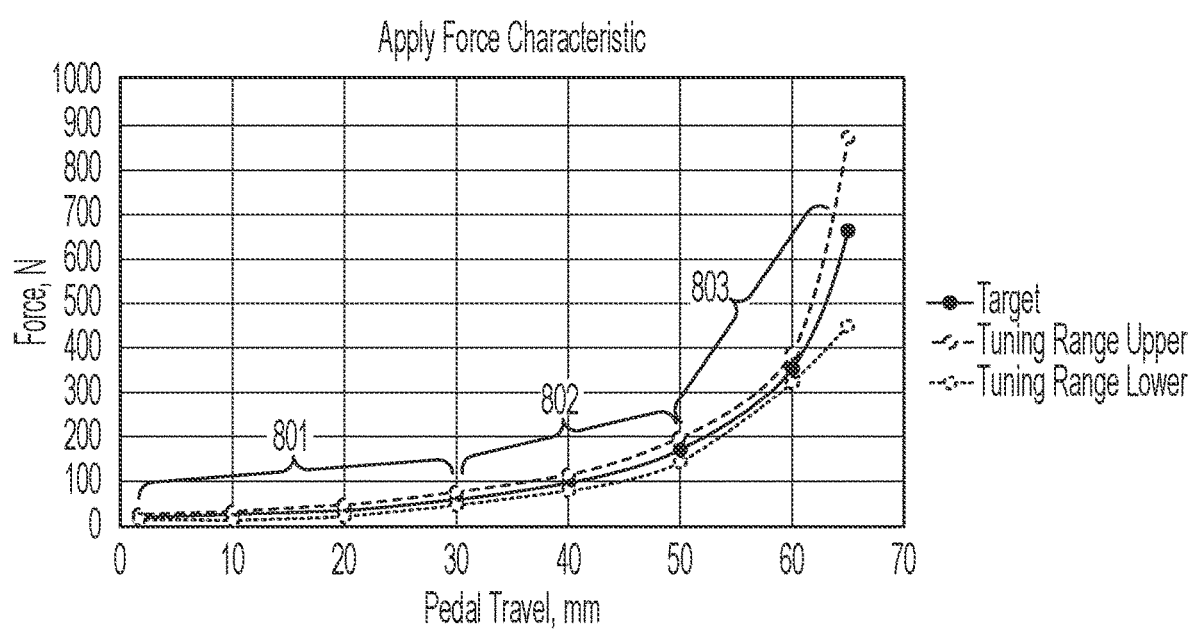
FIG. 8 schematically depicts an illustrative example graph of a pedal travel versus an apply force according to one or more embodiments shown and described herein.

As such, with reference to the three-spring graph in FIG. 8, the effort of compressing the first spring 202 alone is relatively low, however as the second series spring is engaged (e.g., the second spring 220 and the second redundant spring 221), the load output as the force feedback felt by the driver on the pedal pad 22 significantly increases, with the load out being more than compressing just the second spring series (e.g., the second spring 220 and the second redundant spring 221) due to having to maintain compression of the first spring series (the first spring 202 and the first redundant spring 203).

Figure 7:
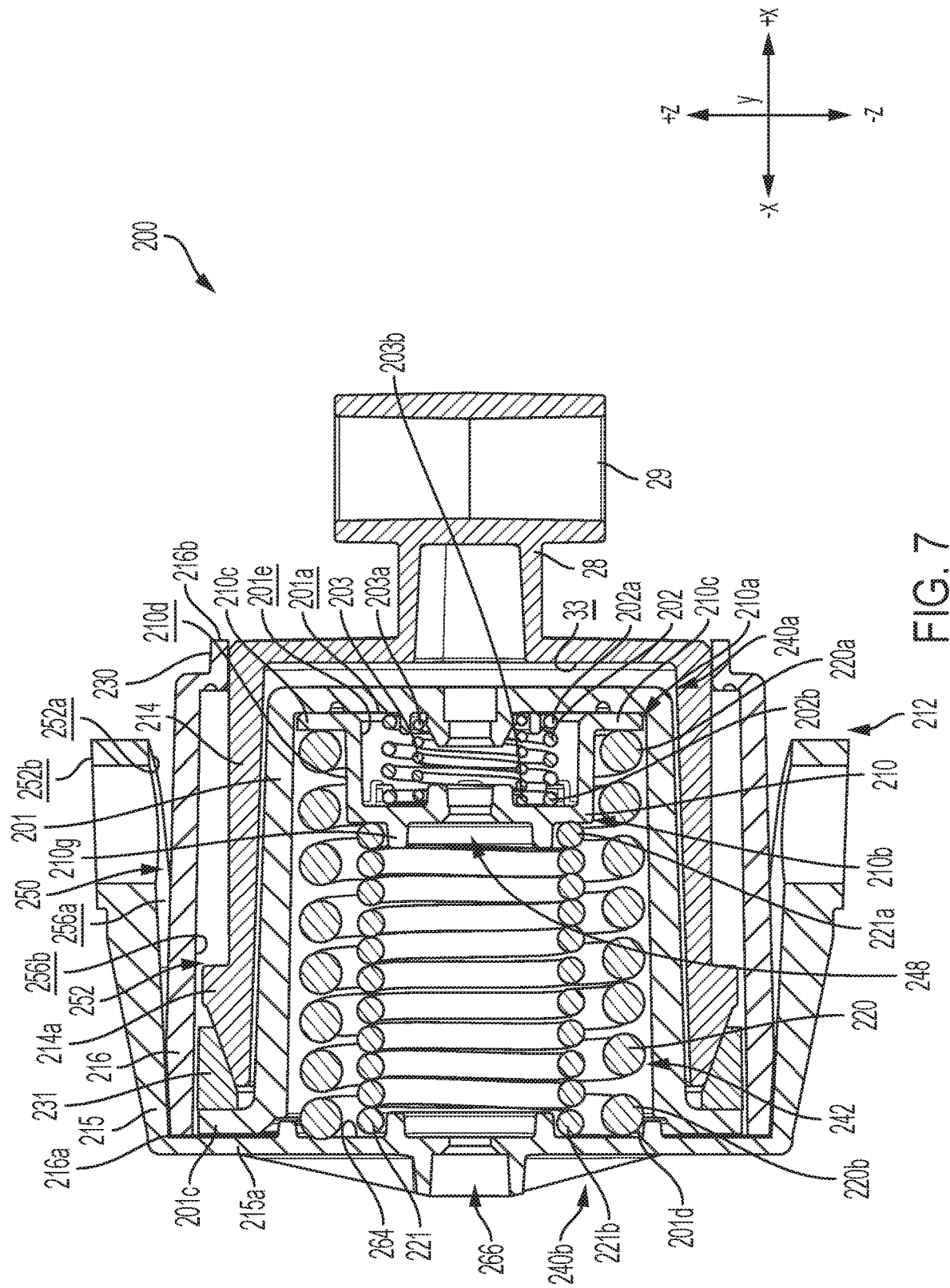
FIG. 7 schematically depicts a cross-sectional view of the first embodiment of the emulator assembly of FIG. 5 with a third predetermined force applied to a pedal pad according to one or more embodiments shown and described herein.

Now referring to FIG. 7, in some embodiments, upon a third predetermined load applied to the pedal pad 22, the second cradle 210 further moves within the coils of the second spring 220 through the proximal end 220a and the second redundant spring 221 in the longitudinal direction (i.e., in the +/−X direction). The outer surface 210d of the flange 210c is already engaged with the proximal end 220a of the second spring 220 of the second cradle 210 and the outer surface 210d of the distal end 210b of the second cradle 210 and engaged with the proximal end 221a of the second redundant spring 221 and further compresses the second spring 220 and the second redundant spring 221 in the longitudinal direction (i.e., in the +/−X direction) to generate the third force feedback, illustrated by bracket 803 in FIG. 8. The third predetermined load applied to the pedal pad 22 is a greater amount of force or load than the second predetermined load. Further, the third force feedback generated and felt by the driver is a greater force than the second force feedback.

That is, FIG. 7 illustrates the full compression of the first example emulator assembly 200, wherein both the first spring 202 (and corresponding first redundant spring 203) and the second spring 220 (and corresponding second redundant spring 221) are fully compressed. The inner surface 201b of the first cradle 201 is in contact with or otherwise abuts the proximal end 210a of the second cradle such that the outer surface 210d at the flange 210c of the second cradle 210 is in contact with or otherwise abuts the inner surface 201b of the first cradle 201. Further, in this position, the rim or lip 201c of the first cradle 201 is in contact with the interior surface 252a of the end cap 215 adjacent to the at least one receiving recess 264.

It should be understood that the as the force applied to the pedal pad 22 is reduced, the second spring 220 and the second redundant spring 221 will seek to shift to equilibrium and consequentially reset the housing 212 internally while supplying a return force to the pedal arm 18.

In some embodiments, the springs 202, 203, 220, 221 may be independently formed with a steel material. In other embodiments, the springs 202, 203, 220, 221 may be independently formed with stainless steel, wire, carbon steel, alloy steel, elgiloy, Monel®, copper, nickel, and/or the like. The housing 12 and/or the upper wall portion 90 may be a molded plastic. For example, the housing 12 and/or the upper wall portion 90 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

Referring to FIG. 8, there is shown a desired force response curve for a pedal. As can be seen, as the pedal travels the greater the apply force that is required. The force is non-linear and increases significantly near the end of the travel of the pedal. This type of force response is typically found in a mechanical pedal design where there is a linkage either mechanically or hydraulically coupled with the brake calipers. As a pedal effort (PE) is applied to the pedal, the pedal arm pivots to allow the pedal to travel. The emulator applies an opposite emulator force (EF) to provide the driver with a resistive force that changes according to the speed in which the PE is applied.

Figure 9:
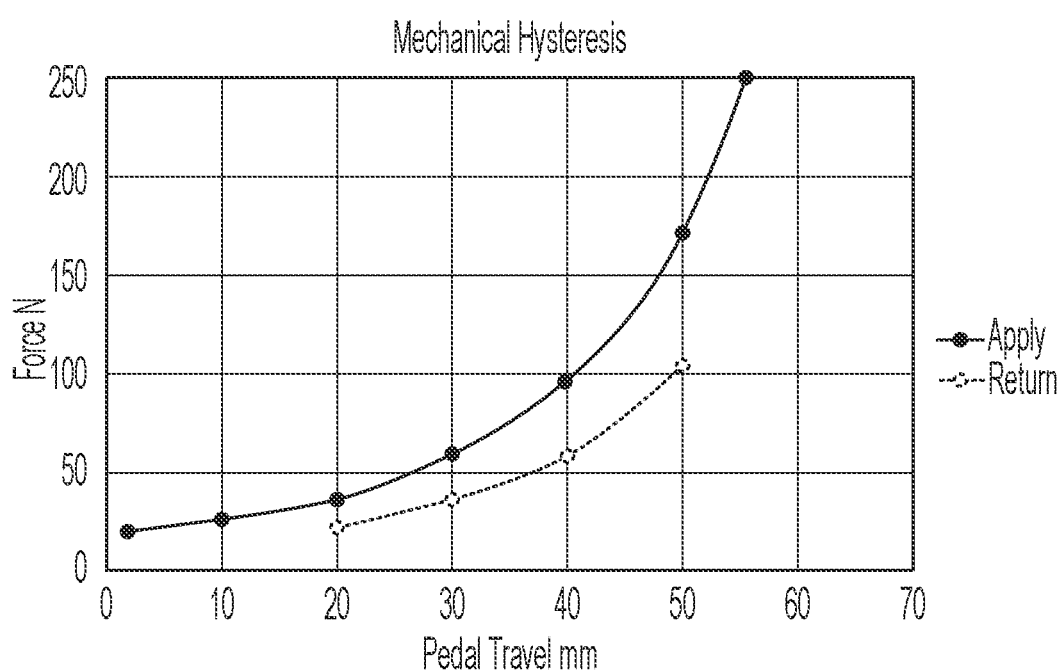
FIG. 9 schematically depicts an illustrative example graph of a pedal travel versus a hysteresis force according to one or more embodiments shown and described herein.

Referring to FIG. 9, there is shown a graph of a desired mechanical hysteresis in terms of a force as a function of the pedal position. As can be seen in the figure, the curve has a similar shape to the apply force denoted in FIG. 8. It is desirable to have such force responses in a drive by wire braking system without a mechanical linkage. Such a system will include a brake pedal emulator that is substitute for a mechanically linked brake pedal.

Figure 10:
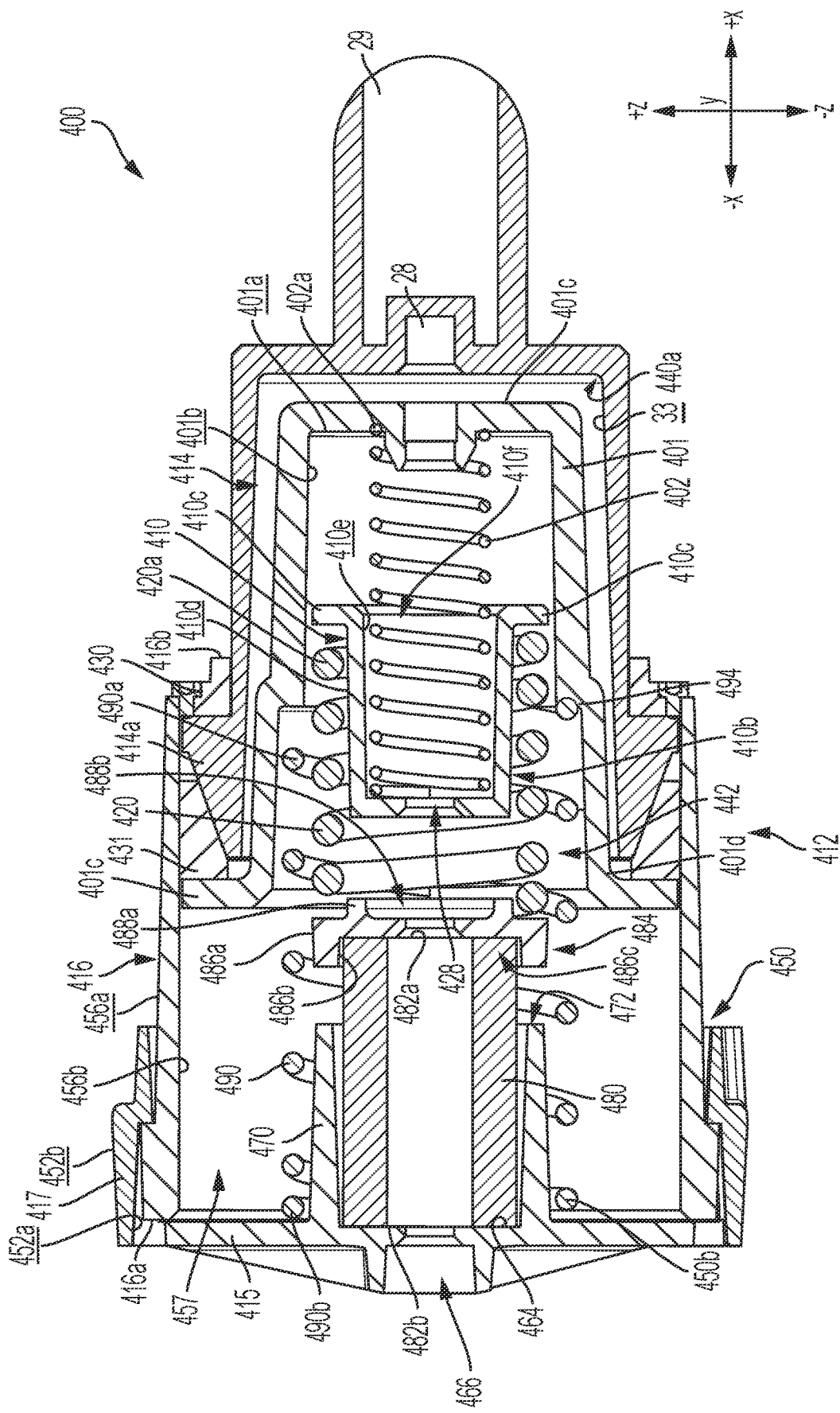
FIG. 10 schematically depicts a cross-sectional view of a second embodiment of the emulator assembly of the pedal assembly of FIG. 1 taken from the line 4-4 with a first predetermined force applied to a pedal pad according to one or more embodiments shown and described herein.

Referring now to FIGS. 10-12, a second example embodiment of an emulator assembly 400 is schematically depicted. It is understood that the emulator assembly 400 is similar to the emulator assembly 200 with the exceptions of the features described herein. As such, like features of the pedal assembly will use the same reference numbers and like features of the emulator assembly will use the same reference numerals with a prefix "4" for the reference numbers. As such, for brevity reasons, these features may not be described again.

The emulator assembly 400 is a three series emulator that includes a first biasing member depicted as a first spring 402, a second biasing member depicted as a second spring 420, and a third biasing member depicted as a third spring 490. This embodiment includes a housing 412. The housing 412 includes the first housing member 414 configured to telescopically move in the longitudinal direction (i.e., in the +/−X direction) relative to the second housing member 416, or vice versa, so as to define portions of the exterior surface. The pushrod 28 is telescopically positioned in the first housing member 414.

The first spring 402 is positioned within the first cradle 401. The proximal end 402a of the first spring 402 rests against and/or is configured to abut, engage, or otherwise be in contact with the inner surface 401b at a proximal end 440a of the first cradle 401. The distal end 402b of the first spring 402 rests against and/or configured to abut, engage, or otherwise be in contact inner surface 410e at the distal end 410b within the cavity 410f. In this embodiment, the second cradle 410 may also be configured in an inverse orientation compared to the first cradle 401. This is non-limiting and the second cradle 410 may be in any orientation with respect to the first cradle 401.

The receiving recess 464 of the end cap 415 includes a sidewall 470 extending from the interior surface 452a in the longitudinal direction (i.e., in the +/−X direction). The sidewall 470 may be circular to define a cavity 472. This is non-limiting and the sidewall 470 may be any shape. The cavity 472 may be configured to receive an elastomer member 480 therein. The elastomer member 480 may include a proximal end 482a and an opposite distal end 482b. The distal end 482b abuts, engages, or otherwise in contact with the interior surface 452a of the end cap 415 within the cavity 472 of the receiving recess 464. The proximal end 482a is positioned to be beyond a terminating portion of the sidewall 470 in the longitudinal direction (i.e., in the +/−X direction).

A third cradle 484 is positioned within the cavity 457 of the second housing member 416. The third cradle includes an outer surface 486a and an opposite inner surface 486b and may generally be shaped circular shaped with a cavity 486c so as to be an inverse C in cross-section. This is non-limiting and the third cradle 484 may be any shape. A protrusion 488a may extend from outer surface 486a in the longitudinal direction (i.e., in the +/−X direction) and may include an aperture 488b permitting access to the cavity 486c.

The proximal end 482a of the elastomer member 480 may be received in the cavity 486c to space the third cradle 484 from the terminating end of the sidewall 470. As such, a length of the elastomer member 480 in the longitudinal direction (i.e., in the +/−X direction) in an uncompressed state, exceeds the terminating end of the sidewall 470.

The second spring 420 may be positioned in the second housing member 416 with the second spring 420 coaxially aligned with the protrusion 488a such that the distal end 420b of the second spring 420 circumferentially surrounds the protrusion 488a of the third cradle 484. The proximal end 420a is configured to make contact with, abut, or otherwise engage with the outer surface 410d of the flange 410c of the second cradle 410 dependent on the load applied to the pushrod 28, as discussed in greater detail above.

The third spring 490 has a proximal end 490a and an opposite distal end 490b. The proximal end 490a of the third spring 450 is dimensioned to fit around a ledge 494 and/or within a recess in a sidewall 401d of the first cradle 401. The third spring 490 has an inner diameter large enough to circumferentially surround the third cradle 484, the sidewall 470 and the receiving recess 464 such that the distal end 490b rest on, abuts, engages, or is otherwise n contact with the interior surface 452a of the end cap 415. Though not shown, it should be appreciated that all the springs in this embodiment may individually further include redundant springs thereof in a similar manner as described above with respect to FIGS. 5-7.

As further shown in FIGS. 10-12, the housing 412 may be configured to collapse. The housing 412 can include the first housing member 414, the second housing member 416, and the end cap 415. At rest, the first spring 402 and the second spring 420 are able to exert an outward force as long as the first spring 402 and the second spring 420 are not allowed to achieve equilibrium therein. The pushrod 28 engages the first housing member 414 to travel telescopically into the second housing member 416. In aspects, the second housing member includes an annular ring 230 about the second housing member 416 that prevents the first housing member 414 from detaching. The first housing member 414 may include a protrusion 414a that engages the stop ring 430 of the second housing member 416. By having the protrusion 414a, the annular ring 430 catches the first housing member 414 from detaching. In some aspects, the housing 412 may feature a friction ring 431 about the circumference or perimeter of an outer rim 401c of the first cradle 401. The friction ring 431 may be tapered, as may be the protrusion 414a, allowing the first housing member 414 to move the first housing member 414 into the second housing member 416 via the first cradle 401.

Referring to FIG. 10, shown is a cross-sectional view of a further emulator assembly 400 with a three spring arrangement therein. The emulator assembly 400 includes the housing 412 with includes a first housing member 414 telescopically positioned longitudinally relative to a second housing member 416. A pushrod 28 is telescopically positioned in the first housing member 414. A deformable elastomer 480 or foam is positioned at an end of the second housing member 416 within the end cap 415. The emulator assembly 400 also includes a third spring 490 and an optional third duplicate spring (not shown). The bottom coils of the third spring 490 rest on the end cap 415 and surround the base of the elastomer 480. Optionally the elastomer 480 is housed within a third cradle 441. The proximal 490a of the third spring 490 is configured such that a ledge 494 within a sidewall of the first cradle 401 can engage the top coils of the third spring 450 as the first cradle is engaged by the pushrod 28 toward the end cap 415. As depicted, the third spring 490 surrounds the elastomer 480 and the second spring 420. It should be noted that this positioning is option and the third spring 450 can be placed elsewhere within the cavity of the housing 412 and still engage the first cradle 410 and the end cap 415.

In operation and with reference to FIG. 10, when the emulator assembly 400 is activated, the pushrod 28 is actuated linearly in the longitudinal direction (i.e., in the +/−X direction), with a first predetermined load applied to the pedal pad 22 with the pressure applied through the first spring 402 against the inner surface 410e at distal end 410b of the first cradle 401. As the first spring 402 compresses in the longitudinal direction (i.e., in the +/−X direction), the first cradle 401 moves in the longitudinal direction (i.e., in the +/−X direction) to generate the first force feedback, illustrated by bracket 801 in FIG. 8.

Now referring to FIG. 11, in some embodiments, upon a second predetermined load applied to the pedal pad 22, the first spring 402 may further compresses in the longitudinal direction (i.e., in the +/−X direction) and the second cradle 410 further moves within the coils of the second spring 420 and through the proximal end 420a of the second spring 420 in the longitudinal direction (i.e., in the +/−X direction). The outer surface 410d of the flange 410c engages the proximal end 420a of the second spring 420 of the second cradle 410. The distal end 420b of the second spring 420 is positioned to engage with the outer surface 486a of the third cradle 484 causing the compression thereof, to generate the second force feedback, illustrated by bracket 802 in FIG. 8. The second predetermined load applied to the pedal pad 22 is a greater amount of force or load than the first predetermined load causing a greater distance of movement of the housing member 414. Further, the second force feedback generated and felt by the driver is a greater force than the first force feedback.

That is, the compression of the first spring 402 into the second cradle 410 is achieved because the first cradle 401, via the pushrod 28, has moved toward the end cap 415 in the longitudinal direction (i.e., in the +/−X direction). The proximal end 402a and the distal end 402b of the first spring 402 have compressed to be have a length closer to one another (e.g., moved toward each other). The first cradle 401, the second cradle 410, and the third cradle 484 have each similarly moved and have had the distance between each of them reduced. The proximal end 420a of the second spring 420 is engaged with the outer surface 410d at the flange 410c of the second cradle 410. Further, the first housing member 414 has telescopically travelled into the second housing member 416, with the protrusion 414a moving away from the stop ring 430, in the longitudinal direction (i.e., in the +/−X direction). The first cradle 401 has also descended into the second housing member 416 in the longitudinal direction (i.e., in the +/−X direction) by the protrusion 414a driving against the friction ring 431 on the outer rim 401c of the first cradle 401. The second spring 420 may not yet to be substantially engaged.

As such, with reference to the three-force graph in FIG. 8, the effort of compressing the first spring 402 alone is relatively low, however as the second series spring is engaged (e.g., the second spring 420), the load output as the force feedback felt by the driver on the pedal pad 22 significantly increases, with the load output being more than compressing just the second spring series (e.g., the second spring 420) due to having to maintain compression of the first spring series (the first spring 402).

Now referring to FIG. 12, in some embodiments, upon a third predetermined load applied to the pedal pad 22, the second cradle 410 further moves within the coils of the second spring 420 through the proximal end 420a to abut with the third cradle 484 in the longitudinal direction (i.e., in the +/−X direction), which in turn applies a force to the third cradle 484 to collapse or deform the elastomer member 480 acting as a biasing member. As such, the outer surface 410d of the second cradle 410 abuts or engaged with the outer surface 486a of the third cradle 484. As such, the first spring 402, the second spring 420, and the third spring 490, all are compressed in the longitudinal direction (i.e., in the +/−X direction) and the load is applied against the elastomer member 480 to collapse or deform the elastomer member 480 acting as a biasing member to generate the third force feedback, illustrated by bracket 803 in FIG. 8. The third predetermined load applied to the pedal pad 22 is a greater amount of force or load than the second predetermined load causing a greater distance of movement of the housing member 414 compared to the first predetermined load and the second predetermined load. Further, the third force feedback generated and felt by the driver is a greater force than the second force feedback.

That is, FIG. 12 illustrates the full compression of the emulator assembly 400, wherein the first spring 402, the second spring 420, and the third spring 490 are compressed and a force is applied by the third cradle 484 onto the elastomer member 480 to cause the elastomer member 480 to act as a biasing member. As the user withdraws pressure from the pedal pad 22, the first spring 402, the second spring 420, and the third spring 490 will seek to shift to equilibrium (e.g., rest position) and consequentially reset the housing 412 internally.

Referring now to FIGS. 14-15, another example embodiment of an emulator 1410 is schematically depicted. The emulator 1410 includes a spring housing 1412 attached to a surface, and a pushrod 1414 positioned within the spring housing 1412. The pushrod 1414 moves between a plurality of positions. The pushrod 1414 includes a distal end 1416 and a proximate end 1418. The proximate end 1418 includes a pedal attachment 1420 that couples to a pedal arm 1422. The pedal arm 1422 is pivotally movable about a pivot 1424. It should be realized that various pedals and pivot locations may be utilized. The distal end 1416 is positioned within a chamber 1426 of the spring housing 1412. The chamber 1426 is configured to receive a plurality of springs and spring carriers, as well as the distal end 1416 of the pushrod 1414.

The pushrod 1414 enters the spring housing 1412 and engages the first series spring 1428, with the proximal end 1418 of the pushrod 1414 remaining outside of the spring housing 1412. In the depicted embodiment, the plurality of springs includes the first series spring 1428, a second series spring 1430 and a parallel third spring 1432. The chamber 1426 also receives the spring cradles. The spring cradles include a first spring cradle 1434 spaced longitudinally (i.e., in the +/−X direction) from a second spring cradle 1436 spaced longitudinally from a third spring cradle 1438.

Remaining with FIG. 15, the spring cradles include a housing surface 1440 extending to a sidewall 1442 that includes a flange 1444 formed thereon. The housing surface 1440 of the first and third spring cradles 1434, 1438 are positioned in the chamber 1426 such that the housing surfaces 1440 are positioned at a top. The second spring cradle 1436 is positioned in the chamber 1426 such that the housing surface 1440 is positioned at a bottom. The housing surfaces 1440 may include a hole 1443 formed therein to allow accommodation of a post as will be described in more detail below.

As shown in FIG. 15, the first spring cradle 1434 contacts the distal end 1416 of the pushrod 1414. The parallel third spring 1432 contacts the flange 1444 of the first spring cradle 1434 and a bottom surface 1446 of the spring housing 1412. The first series spring 1428 contacts the housing surface 1440 of the first and second spring cradle 1434, 1436. The second series spring 1430 contacts the flanges 1444 of the second and third spring cradles 1436, 1438. An elastomeric member 1448 or foam member is positioned between a bottom of the spring housing 1412 and the third spring cradle 1438. The elastomeric member 1448 or foam member acts as a final compression member and stop for travel of the pedal arm 1422. In the depicted embodiment, the elastomeric member 1448 or foam member is positioned about a post of the spring housing 1412 to maintain a position of the elastomeric member 1448 or foam member. A friction member 1450 may be positioned in the spring housing 1412. The friction member 1450 may contact a portion of the pushrod 1414 at the start of travel of the pushrod 1414. The friction member 1450 may be made of various materials and have various shapes to influence the frictional resistance provided.

In operation, when the pedal arm 1422 is depressed by driver, the pushrod 1414 of pedal emulator is actuated linearly, which begins to compress the parallel third spring 1432 and first series spring 1428. As the pushrod 1414 travels further in the spring housing 1412, the second series spring 1430 is compressed. Further travel of the pushrod 1414 in the spring housing 1412 results in compression of the foam member or elastomeric member 1448.

Referring to FIG. 13, the force applied by the various springs 1428, 1430, 1432 and the foam or elastomeric member 1448 are shown as a function of the travel distance. As can be seen in the figure, the various springs apply different forces at the corresponding travel positions. Compression of the foam or elastomeric member 1448 applies a significant force to the pedal. The combination of the various springs and foam or elastomeric member 1448 result in a composite of forces similar to that of the desired force curves of FIGS. 8 and 9.

Referring to FIG. 16, there is shown a further embodiment that includes a non-linear compression spring 312. The non-linear compression spring 312 may be used in any of the embodiments of the emulator assemblies described herein and may be used for any of the various springs described herein, or may be utilized in other pedal assemblies where a spring force is applied to a component of the pedal assembly.

As can be seen in FIG. 16, the spring 1612 includes a coil diameter 1614 and coil pitch 1616 that is not uniform along the length of the spring 1612. As a result, the spring 1612 will have variable force characteristics as the various portions of the spring 1612 are compressed. In one aspect, the first end 1618 of the spring 1612 may include a larger diameter and smaller pitch angle in comparison to the second end 1620 of the spring 1612, which includes a smaller diameter and greater pitch angle.

Referring to FIG. 17, there is shown a graphical depiction of the force or load to compress the spring 1612 as a function of the length. As can be seen in the figure, the force does not behave in a linear manner as the spring is compressed due to the varying diameter and pitch of the spring along its length. The combination of the varying diameter and pitch result in a composite of forces similar to that of the desired force curves of FIGS. 8 and 9.

Thus is disclosed as a novel emulator system. It should be clear to those skilled in the art, that many variations are available within the scope of the invention.

The foregoing description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of ordinary skill in the art.

The terminology used herein is for describing particular embodiments only and is not intended to be limiting. As used herein, the singular forms "a", "an", and "the" are intended to include the plural forms, including "at least one," unless the content clearly indicates otherwise. "Or" means "and/or". As used herein, the term "and/or" includes all combinations of one or more of the associated listed items. It will be further understood that the terms "comprises" and/or "comprising", or "includes" and/or "including" when used in this specification, specify the presence of stated features, regions, integers, steps, operations, elements, components, and/or groups, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Patents, applications, and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular aspects of the invention, but is not meant to be a limitation upon the practice thereof. The following claims, including all equivalents thereof, are intended to define the scope of the invention.

The invention claimed is:

1. A pedal assembly comprising:
a pedal arm configured to move based on a load applied thereon;
a housing including:
a first housing member having:
a first cavity;
a pushrod operably connected to the pedal arm and to the first housing member;
a first cradle positioned within the first cavity and operably movable in a longitudinal direction, the first cradle including a second cavity;
a first biasing member positioned to extend within the second cavity;
a second housing member having a third cavity, a portion of the first housing member and a portion of the first cradle received within the third cavity of the second housing member to move in the longitudinal direction with respect to the second housing member based on the load;
a second biasing member positioned to extend within the third cavity such that the second biasing member is configured to engage with the first cradle, and
a second cradle positioned within the second cavity, wherein:
the first biasing member is positioned to extend within the second cavity between the first cradle and the second cradle; and
the second biasing member is positioned to extend within the second cavity and the third cavity and between the second cradle and an interior surface at least initially spaced apart from the second cradle,
wherein when a first predetermined load is applied to the pedal arm, the pushrod moves a first amount which drives the first cradle against the first biasing member such that at least a compression energy by only the first biasing member generates a first force feedback onto the pedal arm.

2. The pedal assembly of claim 1, further comprising:
an end cap coupled to the second housing member and having the interior surface,
wherein
the second biasing member is positioned to extend within the second cavity and the third cavity and between the second cradle and the interior surface of the end cap.

3. The pedal assembly of claim 2, wherein the interior surface of the end cap includes a receiving recess configured to receive and retain a distal end of the second biasing member.

4. The pedal assembly of claim 2, wherein:
when a second predetermined load is applied to the pedal arm, the pushrod further moves a distance in the longitudinal direction which drives the first cradle towards the interior surface of the end cap in the longitudinal direction and the second cradle towards an inner surface of the first cradle at a proximal end of the first cradle in the longitudinal direction.

5. The pedal assembly of claim 4, wherein when the second predetermined load is applied to the pedal arm, the first biasing member is at least partially compressed and the second biasing member is at least partially compressed to generate a second force feedback onto the pedal arm.

6. The pedal assembly of claim 5, wherein the second predetermined load is greater than the first predetermined load and the second force feedback has a greater force than the first force feedback.

7. The pedal assembly of claim 6, wherein:
when a third predetermined load is applied to the pedal arm, the pushrod further moves a second distance in the longitudinal direction which further drives the first cradle in the longitudinal direction such that the first cradle abuts the interior surface of the end cap and such that the second biasing member is further compressed to generate a third force feedback onto the pedal arm.

8. The pedal assembly of claim 7, wherein when the third predetermined load is applied to the pedal arm, the second cradle is moved to abut the inner surface of the first cradle at the proximal end of the first cradle in the longitudinal direction.

9. The pedal assembly of claim 8, wherein the third predetermined load is greater than the second predetermined load and the third force feedback has a greater force than the second force feedback.

10. The pedal assembly of claim 1, wherein:
the first biasing member is a first pair of springs coaxially aligned such that one of the first pair of springs is positioned within an inner diameter of the other one of the first pair of springs; and
the second biasing member is a second pair of springs coaxially aligned such that one of the second pair of springs is positioned within an inner diameter of the other one of the second pair of springs.

11. A pedal assembly comprising:
a pedal arm configured to move based on a load applied thereon;

a housing operably coupled to the pedal arm, the housing including:
- a first cradle having a cavity and operably movable in a longitudinal direction within the housing;
- a first biasing member positioned to extend within the cavity;
- a housing member having a second cavity, a portion of the first cradle received within the second cavity of the housing member to move in the longitudinal direction with respect to the housing member based on the load;
- a second biasing member positioned to extend within the second cavity such that the second biasing member is configured to engage with the first cradle;

an end cap coupled to the housing member and having an interior surface, a portion of the second biasing member configured to engage with the interior surface;

a second cradle positioned within the cavity of the first cradle, the first biasing member positioned to extend within the cavity between the first cradle and the second cradle; and the second biasing member positioned to extend within the cavity and the second cavity and between the second cradle and the interior surface of the end cap, wherein when a first predetermined load is applied to the pedal arm, the first cradle is driven against the first biasing member such that at least a compression energy by only the first biasing member generates a first force feedback onto the pedal arm.

12. The pedal assembly of claim 11, wherein the interior surface of the end cap includes a receiving recess configured to receive and retain the portion of the second biasing member.

13. The pedal assembly of claim 11, wherein:
when a second predetermined load is applied to the pedal arm, the first cradle further moves in the longitudinal direction towards the interior surface of the end cap and the second cradle towards an inner surface of the first cradle at a proximal end of the first cradle in the longitudinal direction.

14. The pedal assembly of claim 13, wherein when the second predetermined load is applied to the pedal arm, the first biasing member is at least partially compressed and the second biasing member is at least partially compressed to generate a second force feedback onto the pedal arm.

15. The pedal assembly of claim 14, wherein the second predetermined load is greater than the first predetermined load and the second force feedback has a greater force than the first force feedback.

16. The pedal assembly of claim 15, wherein:
when a third predetermined load is applied to the pedal arm, the first cradle further moves in the longitudinal direction such that the first cradle abuts the interior surface of the end cap, the second pair of springs are further compressed to generate a third force feedback onto the pedal arm;

when the third predetermined load is applied to the pedal arm, the second cradle is moved to abut the inner surface of the first cradle at the proximal end of the first cradle in the longitudinal direction; and the third predetermined load is greater than the second predetermined load, the third force feedback has a greater force than the second force feedback.

* * * * *